(12) United States Patent
Kawanabe et al.

(10) Patent No.: US 7,224,522 B2
(45) Date of Patent: May 29, 2007

(54) OPTICAL MICROSCOPE APPARATUS, OPTICAL ELEMENT ARRANGING METHOD, AND STORAGE MEDIUM

(75) Inventors: Hideyuki Kawanabe, Tokyo (JP); Katsuyoshi Yamaguchi, Tokyo (JP); Mitsuhiko Saito, Tokyo (JP); Junzo Sakurai, Tokyo (JP)

(73) Assignee: Olympus Corporation, Tokyo (JP)

( * ) Notice: Subject to any disclaimer, the term of this patent is extended or adjusted under 35 U.S.C. 154(b) by 248 days.

(21) Appl. No.: 10/930,218

(22) Filed: Aug. 31, 2004

(65) Prior Publication Data
US 2005/0052734 A1 Mar. 10, 2005

(30) Foreign Application Priority Data
Sep. 4, 2003 (JP) ............................. 2003-313185

(51) Int. Cl.
G02B 21/00 (2006.01)
(52) U.S. Cl. ....................................... 359/381; 359/388
(58) Field of Classification Search ................ 359/381, 359/384, 382, 388, 385, 392
See application file for complete search history.

(56) References Cited

U.S. PATENT DOCUMENTS

| 4,643,540 | A | * | 2/1987 | Kawasaki et al. | .......... 359/368 |
|---|---|---|---|---|---|
| 5,396,063 | A | | 3/1995 | Ito et al. | |
| 5,648,869 | A | * | 7/1997 | Ikoh | ........................... 359/368 |
| 5,703,714 | A | | 12/1997 | Kojima | |
| 5,706,127 | A | * | 1/1998 | Saito et al. | ................. 359/381 |
| 6,636,353 | B2 | * | 10/2003 | Yamaguchi et al. | ........ 359/381 |
| 2002/0097486 | A1 | | 7/2002 | Yamaguchi et al. | |

FOREIGN PATENT DOCUMENTS

| JP | 8-179218 A | 7/1996 |
|---|---|---|
| JP | 9-21958 A | 1/1997 |
| JP | 11-23975 A | 1/1999 |

OTHER PUBLICATIONS

Patent Abstracts of Japan, vol. 1999, No. 4, Apr. 30, 1999 and JP 11-023075 A (Nikon Corp.), Jan. 29, 1999—Abstract only.

* cited by examiner

*Primary Examiner*—Mark A. Robinson
*Assistant Examiner*—Lee Fineman
(74) *Attorney, Agent, or Firm*—Frishauf, Holtz, Goodman & Chick, P.C.

(57) ABSTRACT

An optical microscope apparatus selectively arranges a plurality of optical elements in an optical path, and includes: a manual switch unit capable of manually switching any of the plurality of optical elements; a detection unit detecting an arrangement status of manually switched optical elements; a storage unit storing information relating to the arrangement of the plurality of optical elements for each observing method; and an arrangement control unit arranging the plurality of optical elements according to the detection result by the detection unit and the information stored in the storage unit.

4 Claims, 23 Drawing Sheets

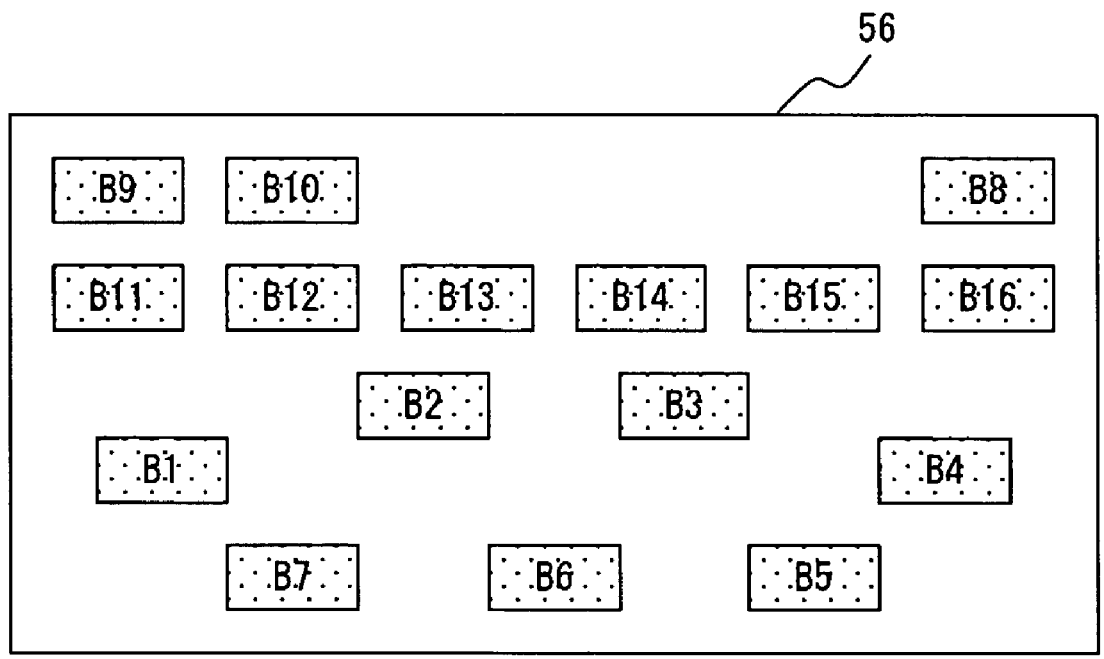
F I G. 4

| MAGNET SET 10-2 | DETECTING HALL ELEMENT 52-3 |
|---|---|
| 10-2a | 001 |
| 10-2b | 010 |
| 10-2c | 011 |
| 10-2d | 100 |
| 10-2e | 101 |
| 10-2f | 110 |

FIG. 6

| PART | POSITION (SIGN) | ATTACHED OPTICAL ELEMENT/MEANINGS |
|---|---|---|
| TRANSMISSION FILTER TURRET | 1 (4a) | ND6 TRANSMITTANCE 6 [%] |
| | 2 (4b) | ND12 TRANSMITTANCE 12 [%] |
| | 3 (4c) | ND25 TRANSMITTANCE 25 [%] |
| | 4 (4d) | ND50 TRANSMITTANCE 50 [%] |
| | 5 (4e) | BLANK |
| | 6 (4f) | LIGHT SHIELD PLATE |
| TRANSMISSION APERTURE DIAPHRAGM | 0 ~ 482 | 0: MINIMUM DIAMETER, 482: MAXIMUM DIAMETER |
| | +1 | |
| | -1 | |
| CONDENSER OPTICAL ELEMENT UNIT | 1 (6a) | BLANK |
| | 2 (6b) | 10X PHASE DIFFERENCE OBSERVATION RING SLIT |
| | 3 (6c) | 20X PHASE DIFFERENCE OBSERVATION RING SLIT |
| | 4 (6d) | BLANK |
| | 5 (6e) | BLANK |
| | 6 (6f) | LIGHT SHIELD PLATE |
| CONDENSER TOP LENS | IN (7a) | |
| | OUT (7b) | |
| REVOLVER/OBJECTIVE LENS | 1 (9a) | 10× |
| | 2 (9b) | 20× |
| | 3 (9c) | 40× |
| | 4 (9d) | 60× |
| | 5 (9e) | FOR 10X PHASE DIFFERENCE OBSERVATION |
| | 6 (9f) | FOR 20X PHASE DIFFERENCE OBSERVATION |
| CUBE CASSETTE | 1 (11a) | MIRROR UNIT FOR BRIGHT VISION |
| | 2 (11b) | MIRROR UNIT FOR PUMPING FLUORESCENT LIGHT G |
| | 3 (11c) | MIRROR UNIT FOR PUMPING FLUORESCENT LIGHT B |
| | 4 (11d) | MIRROR UNIT FOR PUMPING FLUORESCENT LIGHT U |
| | 5 (11e) | BLANK |
| | 6 (11f) | BLANK |
| TRANSMISSION ILLUMINATION LIGHT SOURCE | 0 ~ 120 | ADJUSTING LIGHT: 0~12 [VOLTAGE] |
| | +1 | |
| | -1 | |

F I G. 8

| PART | POSITION (SIGN) | ATTACHED OPTICAL ELEMENT/MEANINGS |
|---|---|---|
| DOWNWARD FILTER TURRET | 1 (16a) | ND6 TRANSMITTANCE 6 [%] |
| | 2 (16b) | ND12 TRANSMITTANCE 12 [%] |
| | 3 (16c) | ND25 TRANSMITTANCE 25 [%] |
| | 4 (16d) | ND50 TRANSMITTANCE 50 [%] |
| | 5 (16e) | BLANK |
| | 6 (16f) | LIGHT SHIELD PLATE |
| DOWNWARD ILLUMINATION LIGHT SOURCE | ON | |
| | OFF | |
| STAGE POSITION | 0 ~ 2000000 | 0 ~ 20 [mm] |
| | +1 | |
| | -1 | |
| AF (AUTOFOCUS) | ON | |
| | OFF | |

FIG. 9

| NUMBER | PART | POSITION |
|---|---|---|
| 1 | TRANSMISSION FILTER TURRET | 3 |
| 2 | TRANSMISSION APERTURE DIAPHRAGM | 100 |
| 3 | CONDENSER OPTICAL ELEMENT UNIT | 1 |
| 4 | CONDENSER TOP LENS | IN |
| 5 | REVOLVER | 1 |
| 6 | CUBE CASSETTE | 1 |
| 7 | TRANSMISSION ILLUMINATION LIGHT SOURCE | 90 |
| 8 | DOWNWARD ILLUMINATION FILTER TURRET | 6 |
| 9 | | |
| 31 | | |
| 32 | | |

BUTTON 1

ALLOCATION INFORMATION 1

F I G. 1 0

| NUMBER | PART | POSITION |
|---|---|---|
| 1 | CONDENSER OPTICAL ELEMENT UNIT | 6 |
| 2 | CONDENSER TOP LENS | OUT |
| 3 | REVOLVER | 2 |
| 4 | CUBE CASSETTE | 3 |
| 5 | TRANSMISSION ILLUMINATION LIGHT SOURCE | ON |
| 6 | DOWNWARD ILLUMINATION FILTER TURRET | 5 |
| 7 | | |
| 31 | | |
| 32 | | |

BUTTON 2

ALLOCATION INFORMATION 1

F I G. 1 1

| NUMBER | PART | POSITION |
|---|---|---|
| 1 | TRANSMISSION ILLUMINATION LIGHT SOURCE | 100 |
| 2 | TRANSMISSION FILTER TURRET | 4 |
| 3 | TRANSMISSION APERTURE DIAPHRAGM | 482 |
| 4 | CONDENSER OPTICAL ELEMENT UNIT | 2 |
| 5 | CONDENSER TOP LENS | IN |
| 6 | REVOLVER | 5 |
| 7 | CUBE CASSETTE | 1 |
| 8 | DOWNWARD ILLUMINATION FILTER TURRET | 6 |
| 9 | | |
| 31 | | |
| 32 | | |

BUTTON 3

ALLOCATION INFORMATION 1

F I G. 1 2

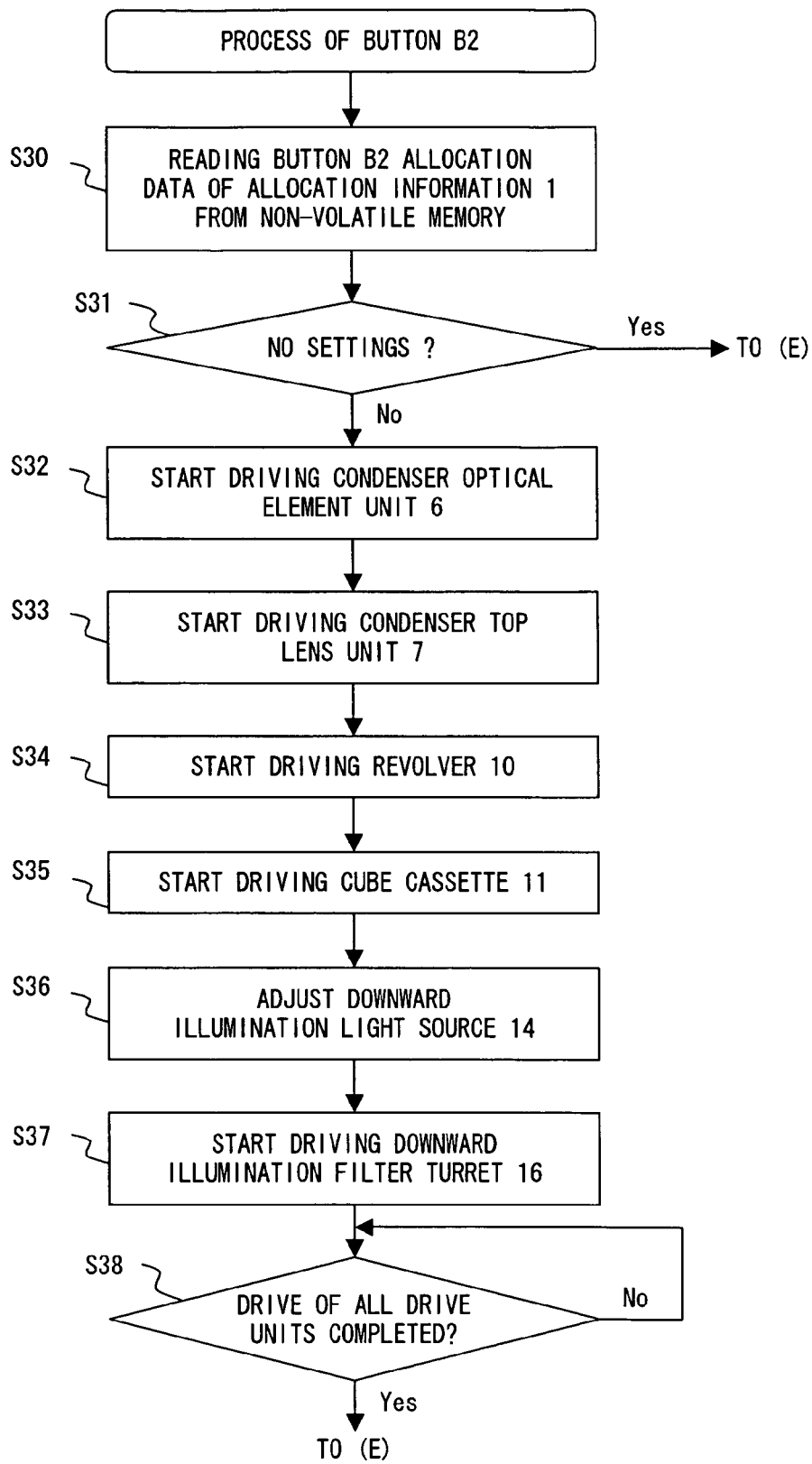
F I G. 1 5

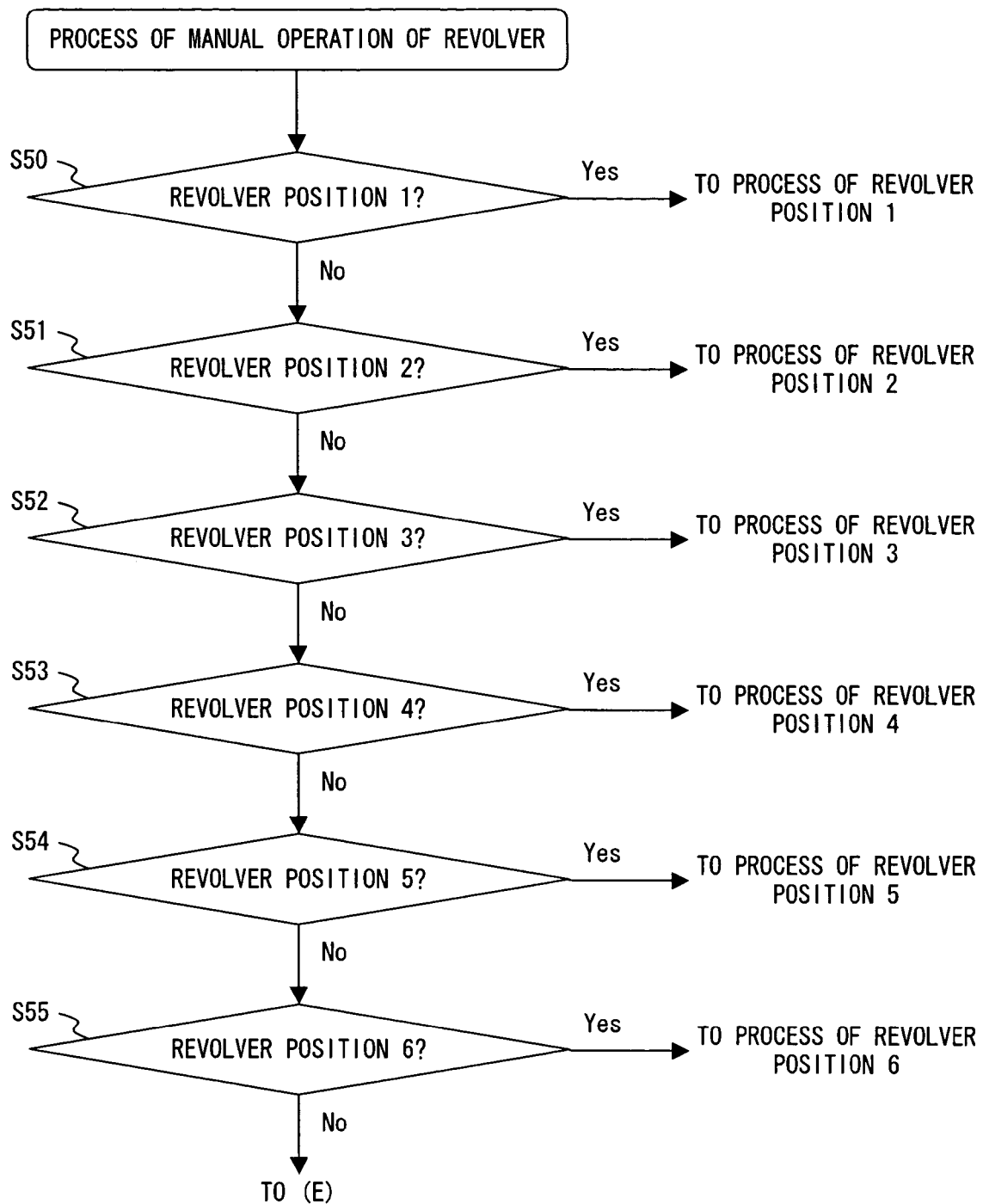
F I G. 1 7

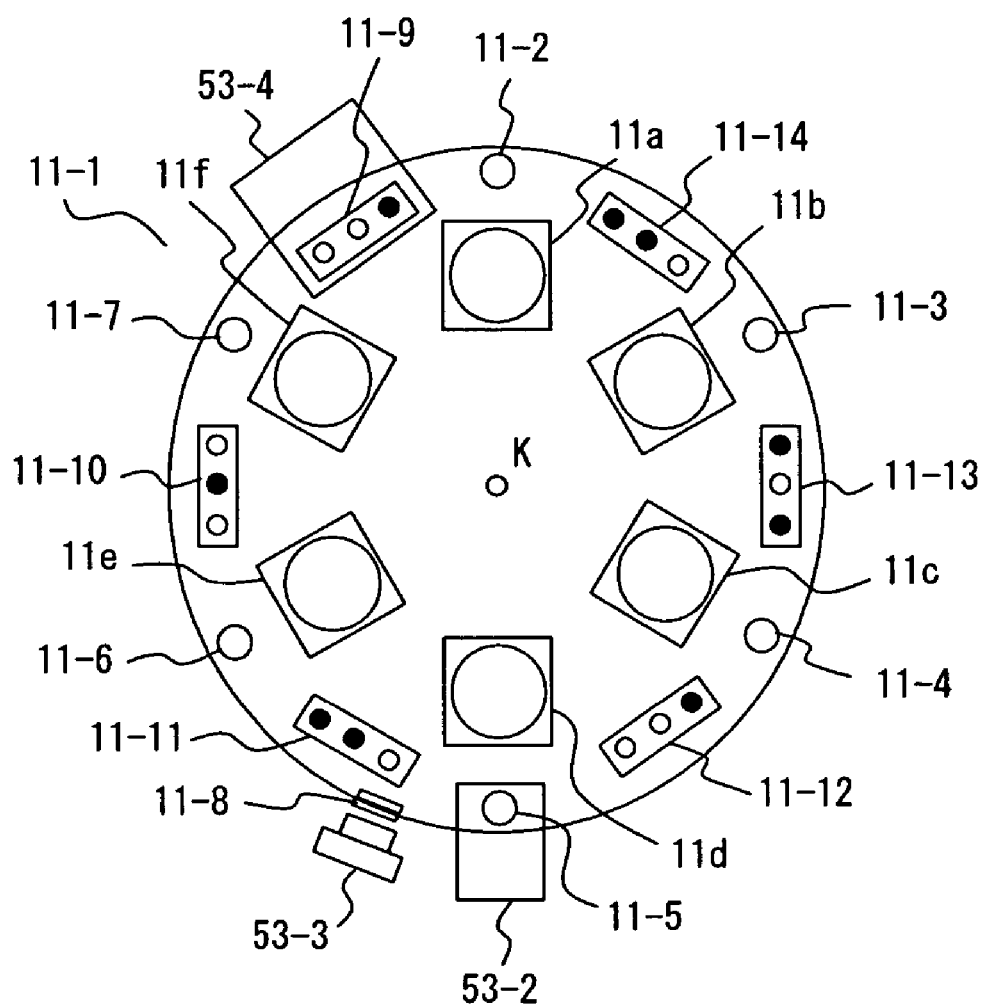
F I G. 22

| MAGNET SET | DETECTION OF HALL ELEMENTS 53-4 |
|---|---|
| 11-9 | 001 |
| 11-10 | 010 |
| 11-11 | 011 |
| 11-12 | 100 |
| 11-13 | 101 |
| 11-14 | 110 |

FIG. 23

OPTICAL MICROSCOPE APPARATUS, OPTICAL ELEMENT ARRANGING METHOD, AND STORAGE MEDIUM

CROSS REFERENCE TO RELATED APPLICATIONS

This application is based upon and claims the benefit of priority from the prior Japanese Patent Application No. 2003-313185, filed on Sep. 4, 2003, the entire contents of which are incorporated herein by reference.

BACKGROUND OF THE INVENTION

1. Field of the Invention

The present invention relates to an optical microscope apparatus for selectively arranging a plurality of optical elements in an optical path.

2. Description of the Related Art

A microscope is used in various observing methods depending on each use in medical and biological fields, or industrial field of producing semiconductors, large-capacity storage media, etc.

To support finer samples to be observed and the diversification in optical features, various observing methods including not only the bright vision observation, the dark vision observation, the differential interference observation, the phase difference observation, and the fluorescent observation, but also the composite observation realized by a combination of them.

Therefore, a microscope realizes an observing method requested by a user by selecting a plurality of optical elements for an optical path from an illumination light source to an eyepiece or a camera, and arranging and combining them.

As microscopes capable of realizing various observing methods, those having a plurality of optical element switch mechanisms and a setting mechanism of an optical element arrangement for realizing each observing method have been developed. To make these complicated setting operations of a microscope easier, there are a number of special devices for setting mechanisms.

For example, Japanese Patent Application Laid-open No. Hei 8-179218 discloses a microscope system including an electric attachment/detachment device for attaching/detaching various optical members to an optical path; a detection device for detecting the attaching/detaching status for the optical path of the optical members; an input device for inputting a control command received from an operator; and a control device for receiving the attachment/detachment status of the optical member from the detection device, and outputting a control command for the electric attachment/detachment device to attachment/detachment control the corresponding optical member corresponding to the control command input from the input device. The microscope system is provided with: a setting device for arbitrarily setting the specification data about various optical members; a storage device for storing the optical member specification data set by the setting device and the specification data even after power shutdown; and a display device for displaying the contents of the specification data of various optical member.

According to the microscope system, it is possible to add optical members having new specification data for a unit of an optical member, thereby realizing the optimum control of an illumination system and a focusing system using added optical members, more easily structuring an environment of the microscope using retrieval of an optical member, and realizing an operability-improved microscope system.

Japanese Patent Application Laid-open No. Hei 11-23975 discloses a microscope including: a revolver capable of attaching and switching a plurality of objective lenses; an input device for inputting code information obtained by coding in each format the mounting position information about the objective lens of the revolver, and the lens information about an objective lens which can be attached to the revolver; a decoding device for decoding the code information input by the input device; and a storage device for storing the mounting position information decoded by the decoding device associated with the lens information.

With the above-mentioned microscope, a microscope of an automatic control type an input device for inputting code information obtained by coding necessary information input prior to use in a predetermined format; a decoding device for decoding the code information input by the input device; a decoding device for decoding the code information input by the input device; and a storage device for storing lens information associated with the mounting position information decoded by the decoding device, etc. With the configuration, when coded information is input, the information is automatically decoded and stored. Therefore, information can be easily input to the microscope.

SUMMARY OF THE INVENTION

An aspect of the present invention is an optical microscope apparatus for selectively arranging a plurality of optical elements in an optical path, and includes a manual switch unit capable of manually switching any of the plurality of optical elements; a detection unit for detecting an arrangement status of manually switched optical elements; a storage unit for storing information relating to the arrangement of the plurality of optical elements for each observing method; and an arrangement control unit for arranging the plurality of optical elements according to the detection result by the detection unit and the information stored in the storage unit.

BRIEF DESCRIPTION OF THE DRAWINGS

FIG. 4 shows the arrangement of the operation buttons B1 through B16 provided for the operation unit;

FIG. 6 is a table showing the combination of a magnet set and a Hall element according to the first embodiment of the present invention;

FIG. 8 shows an optical element attached to the electric optical microscope apparatus according to the first embodiment of the present invention;

FIG. 9 shows an optical element attached to the electric optical microscope apparatus according to the first embodiment of the present invention;

FIG. 10 shows the allocation data of the operation button B1 corresponding to the observing method allocated to the operation button B1 of the allocation information 1 according to the first embodiment of the present invention;

FIG. 11 shows the allocation data of the operation button B2 corresponding to the observing method allocated to the operation button B2 of the allocation information 1 according to the first embodiment of the present invention;

FIG. 12 shows the allocation data of the operation button B3 corresponding to the observing method allocated to the operation button B3 of the allocation information 1 according to the first embodiment of the present invention;

FIG. 15 is a flowchart relating to the process of the operation button B2 according to the first embodiment of the present invention;

FIG. 17 is a flowchart relating to the process of the manual operation of the revolver according to the first embodiment of the present invention;

FIG. 22 shows the portion of upper surface of the cube cassette according to an example of a variation; and FIG. 23 shows a table showing the combination of a magnet set and a Hall element according to and example of a variation;

DESCRIPTION OF THE PREFERRED EMBODIMENT

The embodiments of the present invention are explained below by referring to the attached drawings.

[Embodiment 1]

Figure 1:
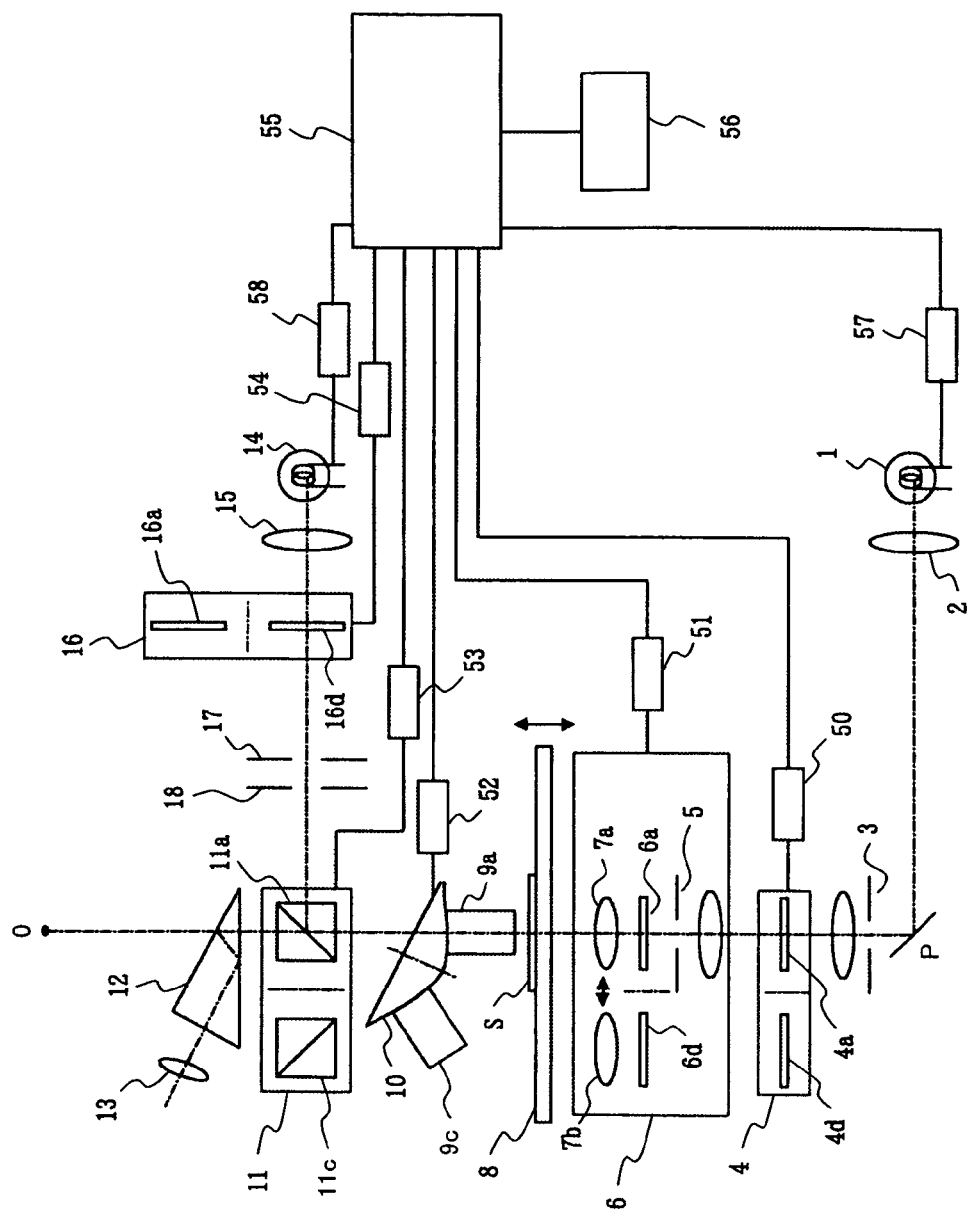
FIG. 1 shows the entire configuration of the electric optical microscope apparatus according to the first embodiment of the present invention.

FIG. 1 shows the entire configuration of the electric optical microscope apparatus according to the first embodiment of the present invention.

As shown in FIG. 1, the optical system of the apparatus collects the light from a transmission illumination light source 1 of, for example, a halogen lamp using a collector lens 2 and inputs the collected light to a transmission filter turret 4 removable to the body of the microscope through a transmission vision diaphragm 3.

The transmission filter turret 4 is provided with a plurality of ND filters for adjusting the brightness without changing the color temperature of the transmission illumination light source 1 or a plurality of correction filters, etc. for performing color correction so that an arbitrary filter can be selectively attached/detached for the optical path of the illumination optical system. In this embodiment, six types of filters 4a through 4f (4a, 4b, 4c, 4d, 4e, and 4f) are as a 6-stage switch filter. The illumination light which has passed the transmission filter turret 4 illuminates the observation sample S on the stage from below a sample stage 8 through a transmittance aperture diaphragm 5, a condenser optical element unit 6, and a condenser top lens unit 7.

The condenser optical element unit 6 comprises a plurality of units 6a through 6f (6a, 6b, 6c, 6d, 6e, and 6f) selectively inserted into the optical path, and the condenser top lens unit 7 comprises a plurality of units 7a and 7b selectively inserted into the optical path. The sample stage 8 can move an observation sample S in a two-dimensional direction on a plane normal to the optical axis, and also can move it in an optical axis direction for focusing.

Above the sample stage 8, a plurality of objective lenses 9a through 9f (9a, 9b, 9c, 9d, 9e, and 9f) are held in a revolver 10. The revolver 10 is a 6-stage switch revolver capable of holding the objective lenses 9a through 9f, and is configured such that its revolution enables the objective lens to be inserted into the optical axis OP (straight line passing the points P and O which is an optical axis) to be exchanged. The revolver 10 is attached to the top of the arm of the apparatus as freely rotatable, and can be removable from the body of the microscope.

A cube cassette 11 removable from the body of the microscope is arranged on the observation optical path at the tip of the arm of the apparatus. The cube cassette 11 is a 6-stage switch cube cassette provided with 6 types of filter cubes 11a through 11f (11a, 11b, 11c, 11d, 11e, and 11f) selectively inserted in various observing methods. The light which has passed through the cube cassette 11 is branched in two directions by a beam splitter 12, that is, one is led to an eyepiece 13 and the other to the taking optical path.

The light from a downward illumination light source 14 formed by, for example, a mercury lamp, etc. is collected by a collector lens 15, and input to a downward illumination filter turret 16 removable to the body of the microscope.

To the downward illumination filter turret 16, for example, a plurality of ND filters for adjusting the brightness of the light without changing the color temperature of the downward illumination light source 14, or a plurality of correction filters, etc. for performing color correction, and any filter can be selectively attached/detached in the optical path of the illumination optical system. In this embodiment, it is a 6-stage switch filter having the filters 16a through 16f (16a, 16b, 16c, 16d, 16e, and 16f).

Through the downward illumination filter turret 16, the light is input to the filter cube 11a inserted into the optical path of the downward illumination aperture diaphragm 17, a downward illumination vision diaphragm 18, and the cube cassette 11, and is illuminated downward to the observation sample S through the objective lens 9.

The fluorescence from the observation sample S or the observation light which is reflected light is branched in two directions by the beam splitter 12 through the objective lens 9 and the cube cassette 11, that is, one is led to the eyepiece 13, and the other to the taking optical path.

The present apparatus further comprises a control unit 55, an operation unit 56, a transmission filter turret drive unit 50, a condenser unit drive unit 51, a revolver drive unit 52, a cube cassette drive unit 53, a downward illumination filter turret drive unit 54, a transmission illumination adjustment unit 57, a downward illumination adjustment unit 58, etc.

Figure 2:
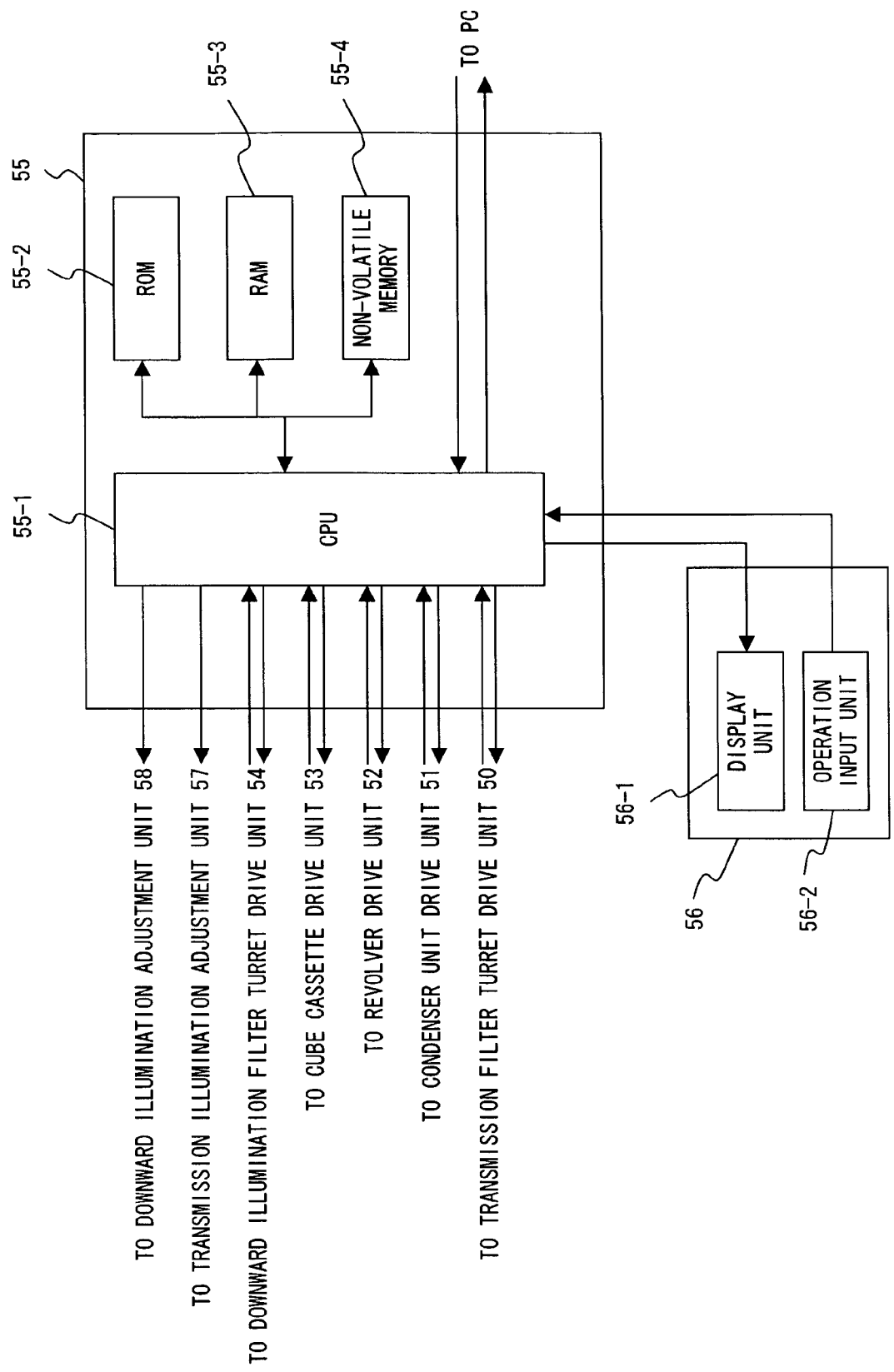
FIG. 2 shows the configuration of the control unit and the operation unit according to the first embodiment of the present invention.

FIG. 2 shows the configuration of the control unit 55 and the operation unit 56.

As shown in FIG. 2, the control unit 55 comprises a CPU 55-1, ROM 55-2, RAM 55-3, and non-volatile memory 55-4 which are connected via each CPU bus. The CPU 55-1 controls the entire operation of the present apparatus by reading and executing a program (including an optical element arranging program) describing the control contents stored in the ROM 55-2. The RAM 55-3 stores data for control arithmetic operations. The non-volatile memory 55-4 is EEPROM, NVRAM, flash memory, etc., and stores operation input allocation information (hereinafter referred to simply as "allocation information") described later for use in storing and reading necessary information.

Figure 3:
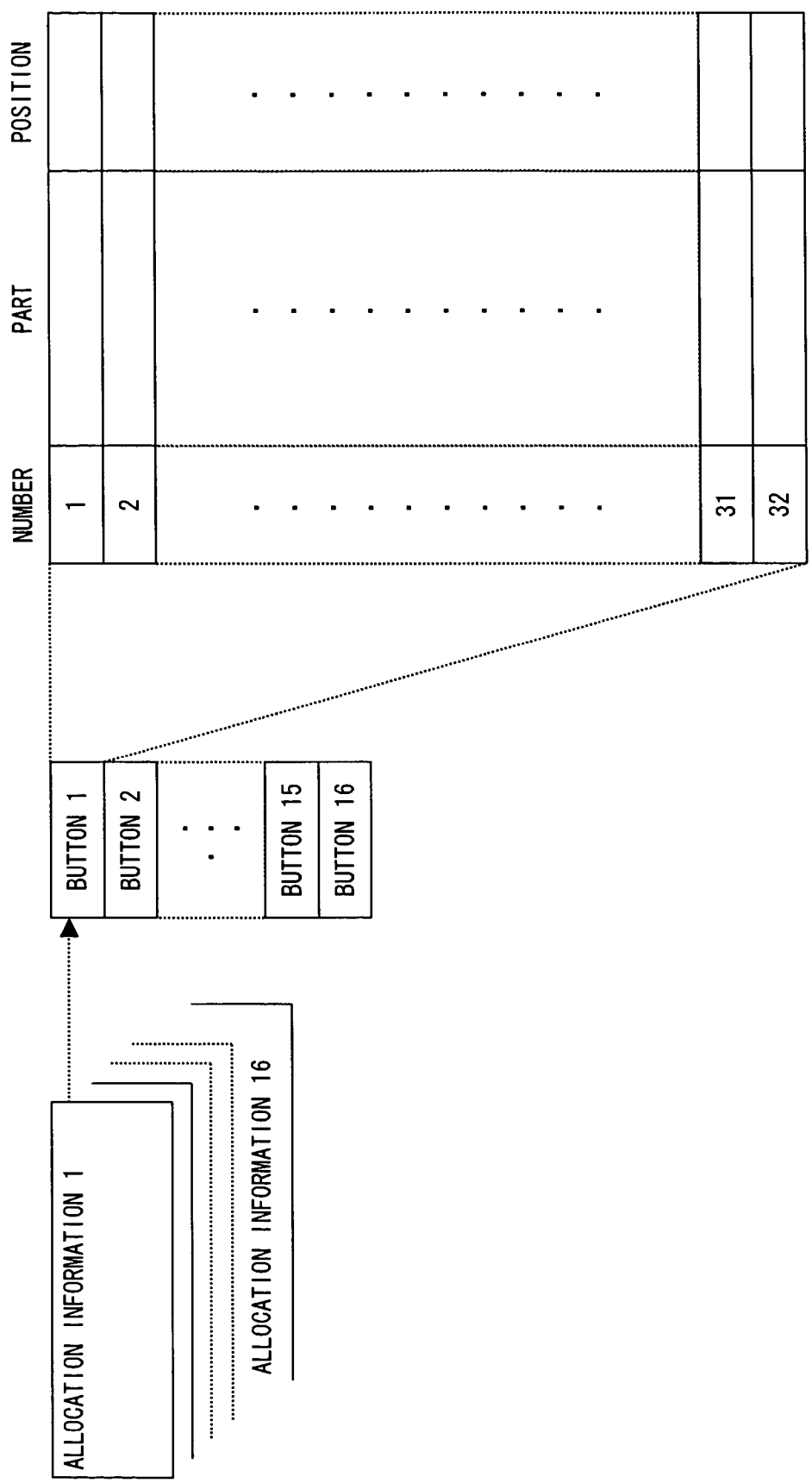
FIG. 3 shows the data structure of the allocation information stored in the non-volatile memory according to the first embodiment of the present invention.

FIG. 3 shows the data structure of the allocation information stored in the non-volatile memory 55-4.

As shown in FIG 3 in the non-volatile memory 55-4 allocation information 1 through 16 is stored as allocation information, and each of the allocation information 1 through 16 is configured by allocation data in which a selectively arranged optical element (drive part, or simply referred to as a part) and the arrangement status (an arrangement position or simply referred to as a position) corresponding to an observing method allocated to each of the operation buttons B1 through B16 (examples of a plurality of designation units or devices) of the operation unit 56 described later are set.

When an operation input from the operation unit 56 is received, the CPU 55-1 controls each drive unit according to the allocation data of the corresponding allocation information.

The operation unit 56 includes a display unit 56-1 and an operation input unit 56-2, it is connected to each CPU 55-1. The display unit 56-1 displays the operation status and positional information, etc. of each drive unit at an instruction from the CPU 55-1. The operation input unit 56-2 outputs an operation signal from the operation input unit to the CPU 55-1.

FIG. 4 shows the arrangement of the operation buttons B1 through B16 provided on the operation unit 56.

On the operation unit 56, the operation buttons B1 through B16 (also referred to as the buttons 1 through 16), are provided with the arrangement shown in FIG. 4, and the operation buttons B1 through B16 are what are called "illuminating button switch" into which light-emitting devices such as LEDs are incorporated, and can turn off, turn on, and blink the light at a signal from the CPU 55-1.

The control unit 55 is provided with an external I/F such as RS-232C, USB, IEEE1394, or Ethernet etc. as an external communications device. Through the external I/F, the CPU 55-1 communicates a command with the external host equipment such as a PC, etc., thereby controlling the drive unit as the operation from the operation unit 56, and exchanging information with an external device.

The transmission filter turret drive unit 50 drives and turns the transmission filter turret 4 according to the drive signal from the control unit 55, and attaches/detaches the filters 4*a* through 4*f* in the optical path. The control unit 55 can also be informed through the transmission filter turret drive unit 50 whether or not the transmission filter turret 4 is operating and which in the filters 4*a* through 4*f* is in the optical path.

The condenser unit drive unit 51 drives and adjusts the transmittance aperture diaphragm 5 according to the drive signal from the control unit 55, and drives and turns the condenser optical element unit 6 and the condenser top lens unit 7 and attaches/detaches them in the optical path. The control unit 55 can be also informed through the condenser unit drive unit 51 whether or not the transmittance aperture diaphragm 5, the condenser optical element unit 6, and the condenser top lens unit 7 are operating, and can be informed of the status of the arrangement, etc. of the transmittance aperture diaphragm 5, the condenser optical element unit 6, and the condenser top lens unit 7 for the optical path through the condenser unit drive unit 51

The revolver drive unit 52 drives and turns the revolver 10 according to the drive signal from the control unit 55, and attaches/detaches the objective lenses 9*a* through 9*f* in the optical path. The control unit 55 can also be informed through the revolver drive unit 52 whether or not the revolver 10 is operating, and can be informed of the status of which in the objective lenses 9*a* through 9*f* is in the optical path, etc. through the revolver drive unit 52.

The cube cassette drive unit 53 drives and turns the cube cassette 11 according to the drive signal from the control unit 55, and attaches/detaches the filter cubes 11*a* through 11*f* in the optical path. Furthermore, the control unit 55 can be informed through the cube cassette drive unit 53 whether or not the cube cassette 11 is operating and informed of which in the filter cubes 11*a* through 11*f* is in the optical path.

The downward illumination filter turret drive unit 54 drives and turns the downward illumination filter turret 16 according to the drive signal from the control unit 55 and attaches/detaches the filters 16*a* through 16*f* in the optical path. The control unit 55 also can be informed through the downward illumination filter turret drive unit 54 whether or not the downward illumination filter turret 16 is operating, and which in the filters 16*a* through 16*f* is in the optical path.

The transmission illumination adjustment unit 57 adjusts the transmission illumination light source 1 according to the light adjustment signal from the control unit 55.

The downward illumination adjustment unit 58 adjusts the downward illumination light source 14 according to the light adjustment signal from the control unit 55.

Figure 5:
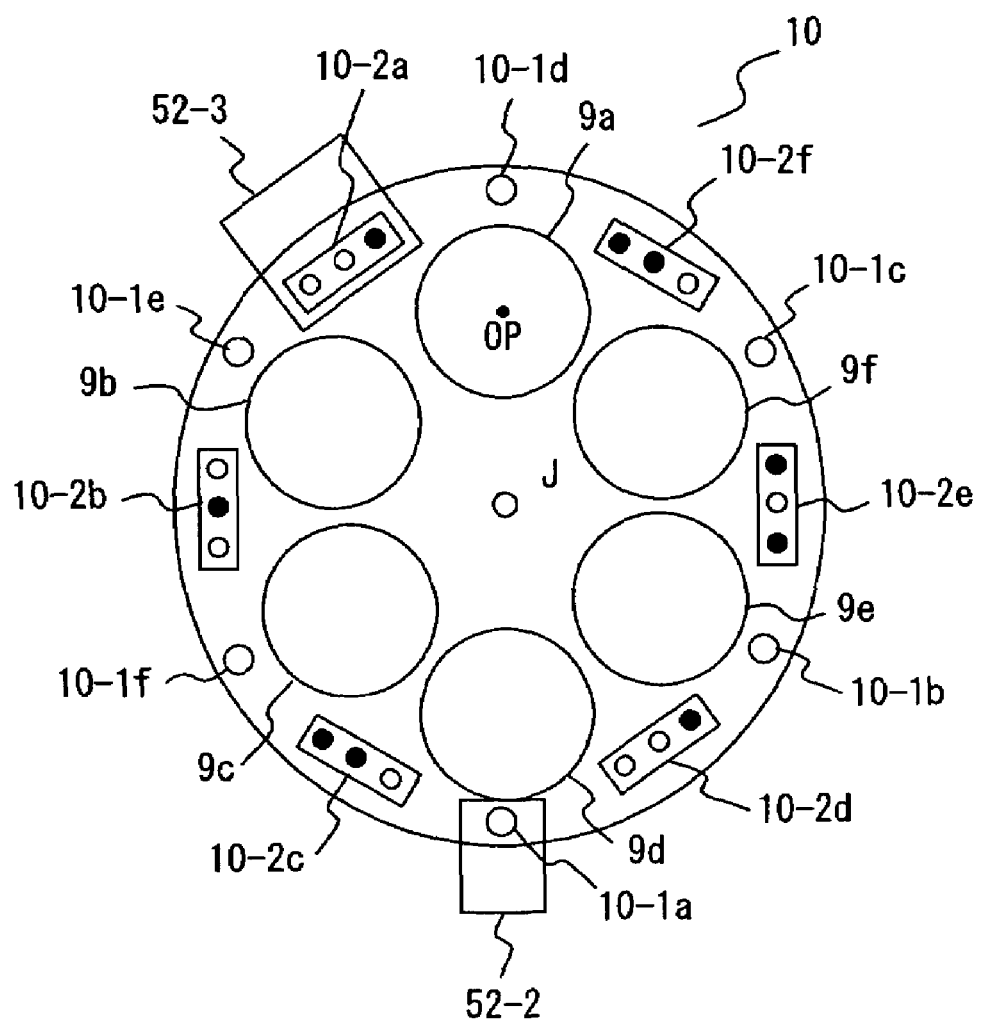
FIG. 5 shows the configuration of each sensor when the revolver is viewed from the cube cassette according to the first embodiment of the present invention.

FIG. 5 is an explanatory view showing the structure and the operation of the revolver 10 and the revolver drive unit 52, and shows the configuration of each sensor when the revolver 10 is viewed from the cube cassette 11.

The revolver 10 can be rotate about the central axis J by a pulse motor 52-1 (not shown in the attached drawings) of the revolver drive unit 52. By appropriately turning the revolver 10 by the pulse motor 52-1, any one of the objective lenses 9*a* through 9*f* held as removable from the revolver 10 can be arranged in the optical path.

On the brim of the revolver 10, apertures 10-1*a* through 10-1*f* are provided depending on the objective lenses 9*a* through 9*f*. The apertures 10-1*a* through 10-1*f* correctly positions and arranges any of the objective lenses 9*a* through 9*f* in the optical path. For example, when the objective lens 9*a* is arranged in the optical path, the existence of the aperture 10-1*a* can be detected by the photo-interrupter 52-2 of the revolver drive unit 52 fixed to the fixing unit of the revolver 10 not rotatable and not shown in the attached drawings. Therefore, the objective lens 9*a* can be correctly positioned and arranged in the optical path.

Additionally, on the brim of the revolver 10, the magnet sets 10-2*a* through 10-2*f* are mounted. The magnet sets 10-2*a* through 10-2*f* are used in detecting which objective lens is arranged in the optical path in the objective lens 9*a* through 9*f* attached to the revolver 10.

For example, when the objective lens 9*a* attached to the revolver 10 is in the optical path, it can be detected by the Hall element 52-3 of the revolver drive unit 52 which is fixed to a fixing unit not shown in the attached drawings and not rotatable in the revolver 10, and attached in the position opposite the magnet set 10-2a. A magnet set 10-2 has three magnet attachment units, and the objective lenses 9a through 9f in the optical path can be identified and detected by the combination of the presence/absence of the attachment of the magnet to the three magnet attachment units.

FIG. 6 shows the combination of the magnet set 10-2 and the Hall element 52-3.

As shown in FIG. 6, for example, when the detection result of the Hall element 52-3 is "001", it can be identified and detected that the arrangement in the optical path is an objective lens 9a.

Figures 7A, 7B:
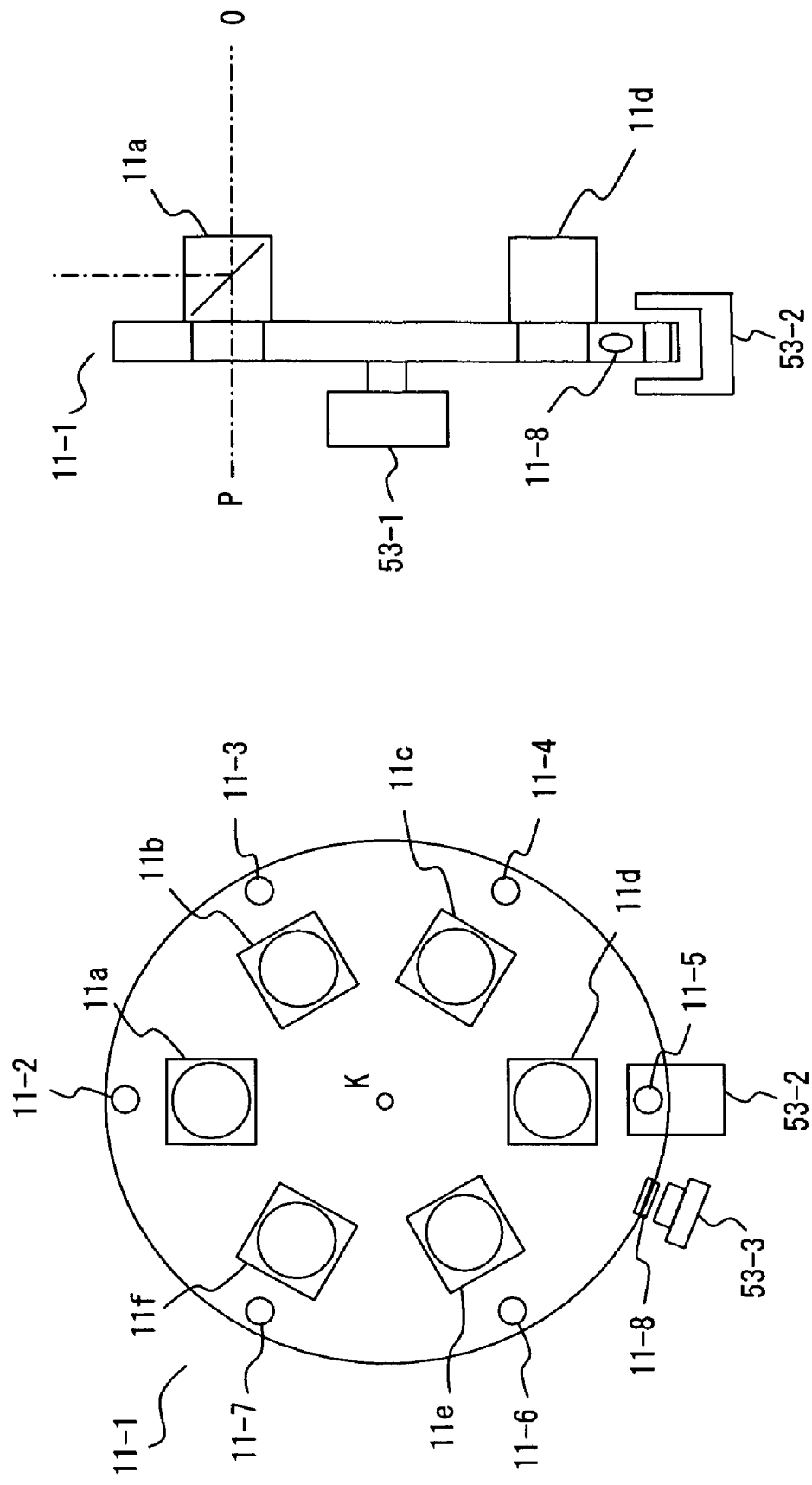
FIG. 7A shows the portion of upper surface of the cube cassette according to the first embodiment of the present invention.
FIG. 7B shows the side portion of the cube cassette according to the first embodiment of the present invention.

FIGS. 7A and 7B are explanatory views of the structure and the operation of the cube cassette 11 and the cube cassette drive unit 53. FIG. 7A is a partial view of the upper surface, and FIG. 7B is a partial view of the side.

In FIGS. 7A and 7B, a circular plate 11-1 of the cube cassette 11 can rotate about the central axis K by a pulse motor 53-1 of the cube cassette drive unit 53. By appropriately rotating the circular plate 11-1 by the pulse motor 53-1, any of the filter cubes 11a through 11f held as removable from the circular plate 11-1 can be arranged in the optical path.

The magnet 11-8 is attached to one point of the circumferencial portion of the circular plate 11-1. The magnet 11-8 is used in detecting the position of the origin of the circular plate 11-1. When the circular plate 11-1 is in the position of the origin, it can be detected by the Hall element 53-3 of the cube cassette drive unit 53 attached in the position opposite the magnet 11-8. On the other hand, on the brim of the circular plate 11-1, apertures 11-2 through 11-7 are provided depending on the filter cubes 11a through 11f. The apertures 11-2 through 11-7 are used in correcting positioning and arranging any of the filter cubes 11a through 11f in the optical path. For example, when the filter cube 11a is arranged in the optical path, the presence of the aperture 11-5 can be detected by the photo-interrupter 53-2 of the cube cassette drive unit 53. Therefore, the filter cube 11a can be correctly positioned and arranged in the optical path.

The transmission filter turret 4 and the downward illumination filter turret 16 are not shown in the attached drawings, but provided with a magnet and a Hall element for detecting the position of the origin, and the aperture and the photo-interrupter for positioning and arranging, and the detection of the origin and the positioning control of the desired position can be performed The operation of the above-mentioned electric optical microscope apparatus is explained is explained below.

In the present operation, it is assumed that the apparatus is provided with an optical element as shown in FIGS. 8 and 9 as a drive part driven by each drive unit. In addition, by a DIP-SW (switch) not shown in the attached drawings, but provided in the control unit 55, the allocation information 1 in the allocation information 1 through 16 stored in the non-volatile memory 55-4 is assumed to be selected as available allocation information. In each of the operation buttons B1 through B3 of the allocation information, it is assumed that the allocation data in which the drive part and its arrangement position corresponding to a predetermined observing method as shown in FIGS. 10 through 12 is set is allocated.

FIGS. 13 through 20 are flowcharts of the operations of the electric optical microscope apparatus, and show the operations performed by the CPU 55-1 of reading a program describing the control contents stored in the ROM 55-2.

Figure 13:
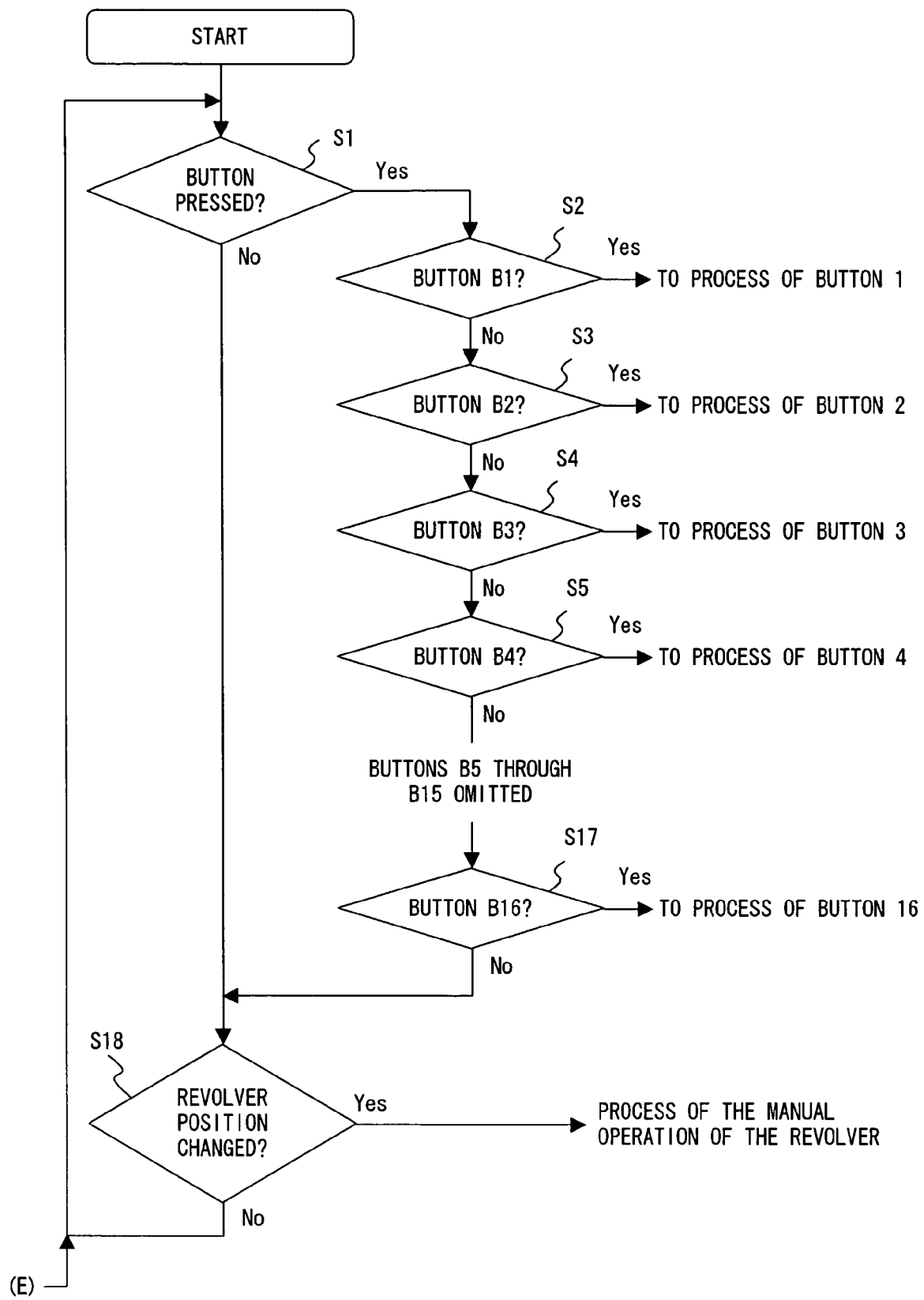
FIG. 13 is a flowchart related to the operation of the electric optical microscope apparatus according to the first embodiment of the present invention.

In the present operations, as shown in FIG. 13, it is first determined which in the operation buttons of the operation unit 56 has been pressed (step (hereinafter referred to simply as S)1). If the determination result is YES, the pressed button is sequentially determined whether it is the operation button B1 (S2), the operation button B2 (S3), the operation button B3 (S4), the operation button B4 (S5), . . . , the operation button B16 (S4). If the determination result is YES, the corresponding operation is performed. If the determination result is NO, control is passed to step S18.

On the other hand, if the determination result in S1 is NO, or the determination result in S17 is NO, then it is determined whether or not the arrangement position of the revolver 10 has been changed in the manual operation (S18). If the determination result is YES, control is passed to the process of the manual operation of the revolver. If NO, control is returned to step S1.

Figure 14:
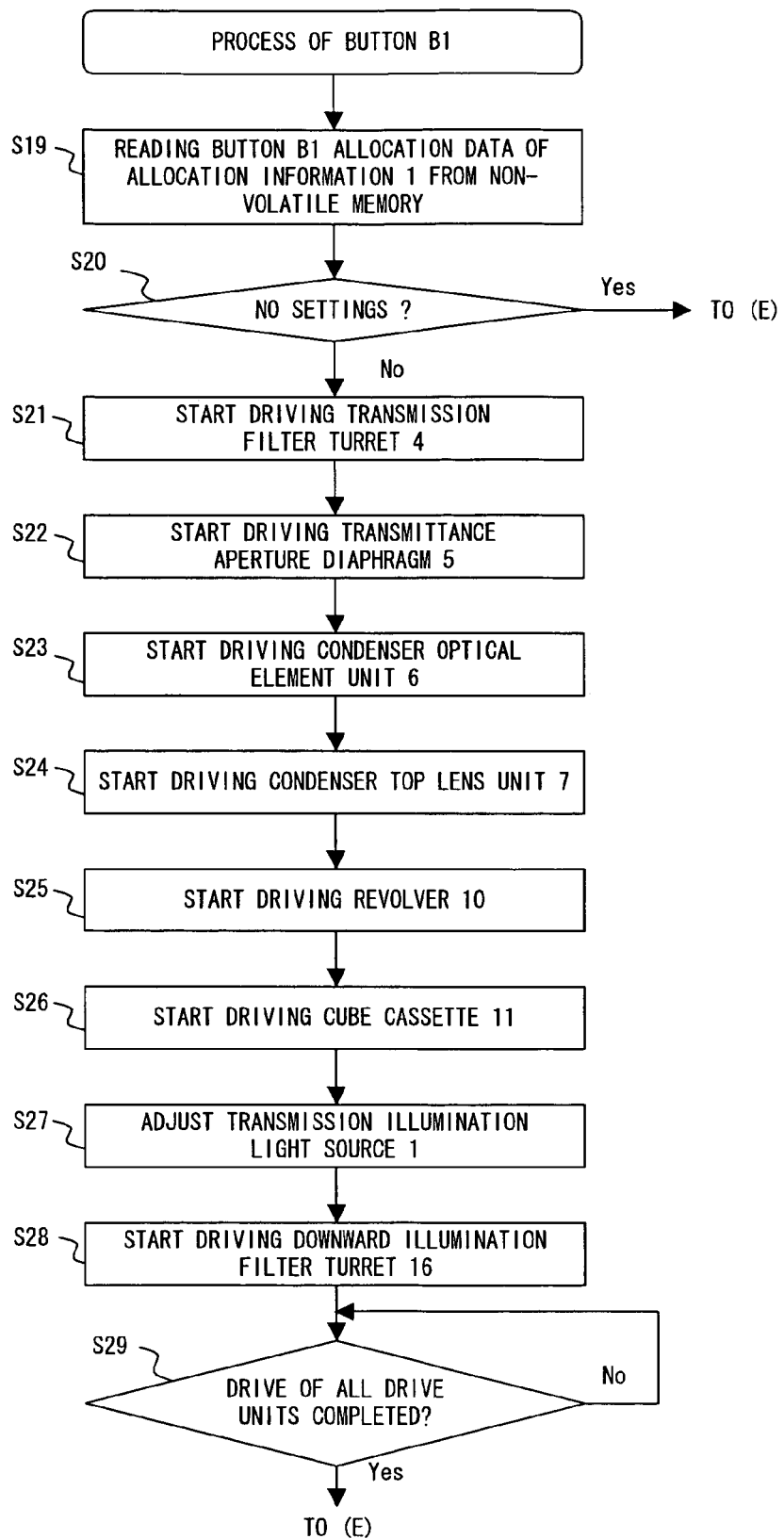
FIG. 14 is a flowchart relating to the process of the operation button B1 according to the first embodiment of the present invention.

In this operation, for example, the operation button B1 of the operation unit 56 is pressed, the CPU 55-1 detects the operation input of the operation button B1 (YES in S1, YES in S2), the drive of each power mechanism is started in the process of the operation button B1 shown in FIG. 14.

In the process of the operation button B1, as shown in FIG. 14, first, the operation button B1 allocation data corresponding to the observing method assigned to the operation button B1 of the allocation information 1 selected by the DIP-SW not shown in the attached drawings but provided for the control unit 55 is read from the non-volatile memory 55-4 (S19).

Then, the read operation button B1 allocation data is referred to, it is determined whether or not nothing is set for the arrangement position of the drive part (S20). If the determination result is YES, no process is performed and control is returned to step S1 (control is passed to (E)), and the operation input of the next operation buttons B1 through B6 is awaited. If the determination result is NO, each drive part is driven according to the operation button B1 allocation data.

As shown in FIG. 10, the switching operations number 1 through 8 are set as the transmission bright vision observation using the 10× objective lens in the operation button B1 allocation data in the operation button B1 allocation data assigned to the operation button B1 of the allocation information 1. That is, the settings are made as follows: the transmission filter turret 4 is switched to the position 3 (4c), the transmittance aperture diaphragm 5 is switched to the position 100, the condenser optical element unit 6 is switched to the position 1 (6a), the condenser top lens unit 7 is switched to the position IN (7a), the revolver 10/objective lens 9 is switched to the position 1 (9a), the cube cassette 11 is switched to the position 1 (11a), the transmission illumination light source 1 is adjusted to the position 90 (9V), the downward illumination filter turret 16 is switched to the position 6 (16f)

The downward illumination filter turret 16 is switched to the position 6 (16f) to shut off the light of the downward illumination light source 14 by the light shield plate shutting off the downward illumination light source 14 to remove the undesired influence of the stray light to the transmission bright vision observation, etc.

According to the operation button B1 allocation data of the allocation information 1 read from the non-volatile memory 55-4, the CPU 55-1 starts driving the transmission filter turret 4 in the position 3 (4c) through the transmission filter turret drive unit 50 (S21), the transmittance aperture diaphragm 5 in the position 100, the condenser optical element unit 6 in the position 1 (6a), and the condenser top lens unit 7 in the position IN (7a) are drive-started through the condenser unit drive unit 51 (S22 through S24), the revolver 10/objective lens 9 is drive-started in the position 1 (9a) through the revolver drive unit 52 (S25), the cube cassette 11 is drive-started in the position 1 (11a) through the cube cassette drive unit 53 (S26), the transmission illumination light source 1 is adjusted in the position 90 (9V) through the transmission illumination adjustment unit 57 (S27), and the downward illumination filter turret 16 is drive-started in the position 6 (16f) through the downward illumination filter turret drive unit 54.

Then, the CPU 55-1 determines whether or not the drive of all drive units has been completed (S29). If the determination is NO, the determining process is repeated. If it is YES, the process of the operation button B1 which is the switch control corresponding to the allocation of the operation button B1 is terminated, control is returned to step S1 (control is passed to (E)), and the operation input of the next operation buttons B1 through B16 is awaited.

Thus, by the operation input of the operation button B1, the ND25 is arranged in the optical path in the transmission filter turret 4, the transmittance aperture diaphragm 5 is switched to the aperture diameter 100, and is a blank hole as the bright vision observation in the condenser optical element unit 6. The condenser top lens unit 7 is arranged in the optical path, the objective lens 9 is switched to 10×, and the mirror unit for a bright vision is arranged in the optical path in the cube cassette 11, the transmission illumination light source 1 is adjusted to 9V, and the light shield plate is arranged in the downward illumination path and the downward illumination is shut off in the downward illumination filter turret 16, the downward illumination is shut off, and as a result, the transmission bright vision observation is realized using the 10× objective lens.

Furthermore, in the present operation, when the operation button B2 of the operation unit 56 is pressed, the CPU 55-1 detects the operation input of the operation button B2 (YES in S1, YES in S3), and the drive of each power mechanism in the process of the operation button B2 in FIG. 15 is started.

In the process of the operation button B2, as shown in FIG. 15, the operation button B2 allocation data corresponding to the observing method allocated to the operation button B2 of the allocation information 1 selected by the DIP-SW not shown in the attached drawings provided for the control unit 55 is read from the non-volatile memory 55-4 (S30).

Then, the read operation button B2 allocation data is referred to, it is determined whether or not nothing is set about the arrangement position of a drive part (S31). If the determination result is YES, no process is performed and control is returned to step S1 (control is passed to (E)), and the next operation input of the operation buttons B1 through B16 is awaited. When the determination result is NO, each drive part is driven according to the operation button B2 allocation data.

As shown in FIG. 11, the switching operation of the numbers 1 through 6 are set as the downward fluorescent observation using a 20× objective lens in the operation button B2 allocation data allocated to the operation button B2 of the allocation information 1. That is, the settings are made as follows: the condenser optical element unit 6 is switched to the position 6 (6f), the condenser top lens unit 7 is switched to the position OUT (7b), the revolver 10/objective lens 9 is switched to the position 2 (9b), the cube cassette 11 is switched to the position 3 (11c), the downward illumination light source 14 is adjusted to the position ON (turned on), and the downward illumination filter turret 16 is switched to the position 5 (16e).

The condenser optical element unit 6 is switched to the position 6 (6f) because the attached light shield plate can remove the undesired influence by the stray light to the downward fluorescent observation by shutting off the transmission illumination light source 1, and the condenser top lens unit 7 is switched to the position OUT (7b) to remove the undesired influence to the downward fluorescent observation by the self-fluorescence by a top lens, etc.

According to the operation button B2 allocation data of the allocation information 1 read from the non-volatile memory 55-4, the CPU 55-1 starts driving the condenser optical element unit 6 in the position 6 (6f) and the condenser top lens unit 7 in the position OUT (7b) through the condenser unit drive unit 51 (S32, S33), starts driving the revolver 10/objective lens 9 in the position 2 (9b) through the revolver drive unit 52 (S34), starts driving the cube cassette 11 in the position 3 (11c) through the cube cassette drive unit 53 (S35), adjusts the downward illumination light source 14 in the position ON (turned on) through the downward illumination adjustment unit 58 (S36), and starts driving the downward illumination filter turret 16 in the position 5 (16e) through the downward illumination filter turret drive unit 54 (S37).

Then, the CPU 55-1 determines whether or not the drive of all drive units has been completed (S37). Then the determination result is NO, the determining process is repeated. If it is YES, the process of the operation button B2 which is switch control corresponding to the allocation of the operation button B2 is terminated, control is returned to step S1 (control is passed to (E)), and the next operation input of the operation buttons B1 through B16 is awaited.

Thus, by the operation input of the operation button B2, the light shield plate is arranged in the optical path in the condenser optical element unit 6, and the condenser optical element unit 6 is removed from the optical path, the objective lens 9 is switched to 20×, the fluorescent B pumping mirror unit is arranged into an optical path in the cube cassette 11, the downward illumination light source 14 is turned on, the blank hole is arranged in the optical path and the downward illumination is 100% transmitted in the downward illumination filter turret 16, and as a result downward fluorescent observation is realized using a 20 × objective lens.

Figure 16:
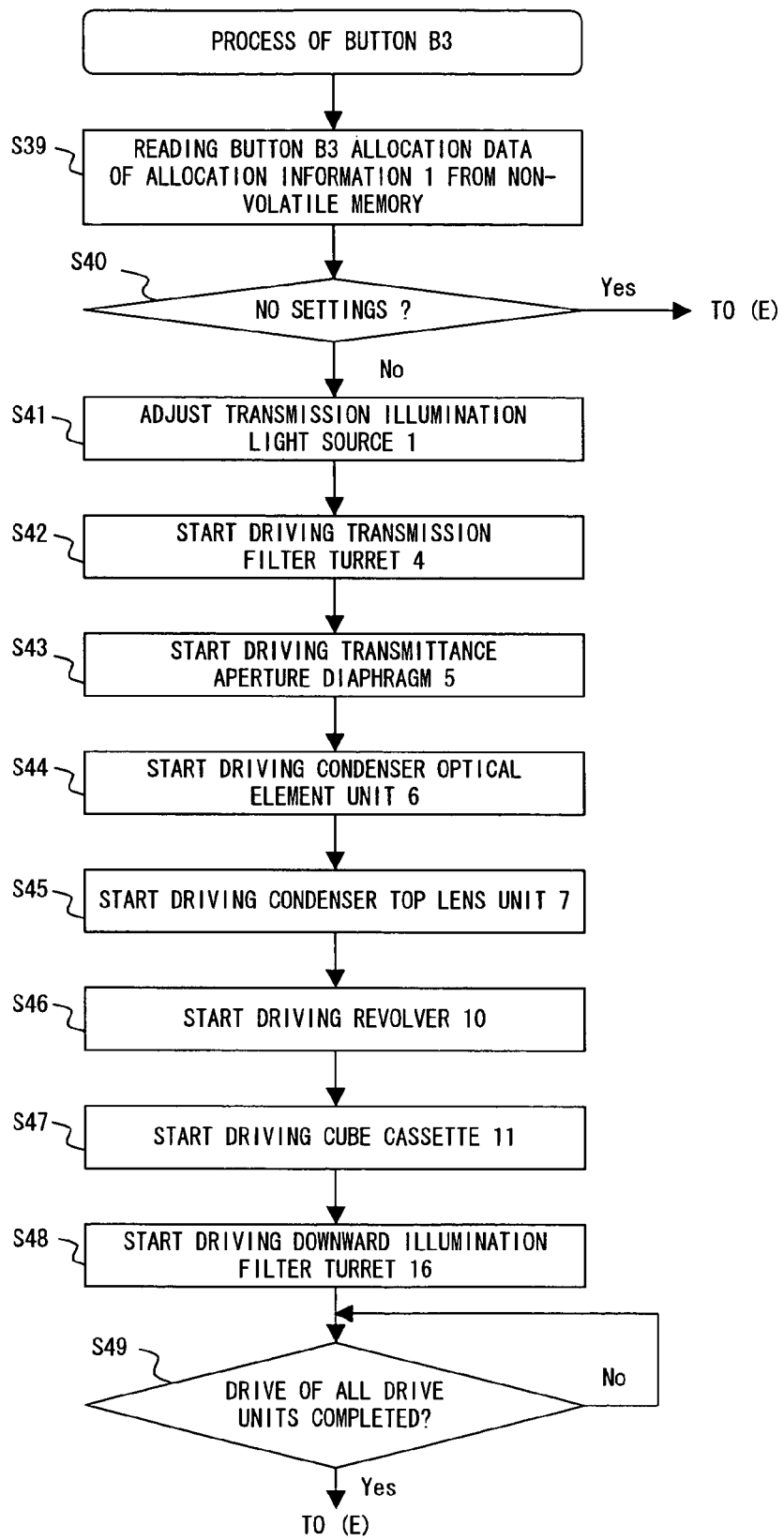
FIG. 16 is a flowchart relating to the process of the operation button B3 according to the first embodiment of the present invention.

Furthermore, in the present operation, when the operation button B3 of the operation unit 56 is pressed, the CPU 55-1 detects the operation input of the operation button B3 (YES in S1, YES in S4), and the drive of each power mechanism in the process of the operation button B3 in FIG.16 is started.

In the process of the operation button B3, as shown in FIG. 16, the operation button B3 allocation data corresponding to the observing method allocated to the operation button B3 of the allocation information 1 selected by the DIP-SW not shown in the attached drawings but provided in the control unit 55 is read from the non-volatile memory 55-4 (S39).

Then, the read operation button B3 allocation data is referred to, and it is determined whether or not nothing is set for the arrangement position of the drive part (S40). If the determination result is YES, no process is performed and control is returned to step S1 (control is passed to (E)), and the next operation input of the operation buttons B1 through B16 is awaited. If the determination result is NO, each drive part is driven according to the operation button B3 allocate data.

As shown in FIG. 12, the switching operation of numbers 1 through 8 are set as the phase difference observation using the 10× objective lens in the operation button B3 allocation data allocated to the operation button B3 of the allocation information 1. That is, the settings are made as follows: the transmission illumination light source 1 is adjusted to the position 100 (10V), and the transmission filter turret 4 is switched to the position 4 (4d), the transmittance aperture diaphragm 5 is switched to 482 (maximum diameter), the condenser optical element unit 6 is switched to the position 2 (6a), the condenser top lens unit 7 is switched to the position IN (7a), the revolver 10/objective lens 9 is switched to the 5 (9e), the cube cassette 11 is switched to the position 1 (11a), and the downward illumination filter turret 16 is switched to the position 6 (16f).

According to the operation button B3 allocation data of the allocation information 1 read from the non-volatile memory 55-4, the CPU 55-1 adjusts the transmission illumination light source 1 in the position 100 (10V) through the transmission illumination adjustment unit 57 (S41), starts driving the transmission filter turret 4 in the position 4 (4d) through the transmission filter turret drive unit 50 (S42), starts driving the transmittance aperture diaphragm 5 in the position 482 (maximum diameter), the condenser optical element unit 6 in the position 2 (6b), the condenser top lens unit 7 in the position OUT (7b) through the condenser unit drive unit 51 (S43 through S45), the revolver 10/objective lens 9 in the position 5 (9e) through the revolver drive unit 52 (S46), the cube cassette 11 in the position 1 (11a) through the cube cassette drive unit 53 (S47), and the downward illumination filter turret 16 in the position 6 (16f) through the downward illumination filter turret drive unit 54 (S48).

Then, the CPU 55-1 determines whether or not the drive of all drive units bas been completed (S49). If the determination result is NO, the present determining process is repeated. If it is YES, the process of the operation button B3 which is the switching control corresponding to the allocation of the operation button B3 is completed, control is returned to step S1 (control is passed to (E)), and the operation input of the operation buttons B1 through B16 is awaited.

Thus, by the operation input of the operation button B3, the transmission illumination light source is adjusted to 10V, the ND 50 is arranged in the optical path in the transmission filter turret 4, the transmittance aperture diaphragm 5 is switched to the maximum diameter of the aperture, the 10× phase difference observation ring slit is arranged in the optical path in the condenser optical element unit 6, the condenser top lens unit 7 is arranged in the optical path, the objective lens 9 is switched to the use for the 10× phase difference observation, the bright vision mirror unit is arranged in the optical path in the cube cassette 11, the light shield plate is arranged in the downward illumination optical path and the downward illumination is shut off in the downward illumination filter turret 16, and as a result the phase difference observation with 10× objective lens is realized.

Furthermore, in the present operation, when any of the operation buttons B4 through B16 of the operation unit 56 is pressed, the corresponding operation button process (any of the processes of the operation buttons B4 through B16) is performed as in the above-mentioned operation, and a predetermined observing method is realized.

In the present operation, when the revolver 10 is rotated, the CPU 55-1 detects the rotation of the revolver 10 (YES in S18), and the process of the manual operation of the revolver shown in FIG. 17 is started.

In the process of the manual operation of the revolver, as shown in FIG. 17, the position of the revolver 10 after the rotation is determined to be 1 (S50), 2 (S51), 3 (S52), 4 (S53), 5 (S54), or 6 (S55). If any determination result is YES, the corresponding process of the revolver position is performed. If the determination result is NO, control is returned to step S1 (control is passed to (E)).

In the above-mentioned operation, for example, when the objective lens 9e (revolver position 2) is inserted in the optical path, the revolver 10 is manually rotated. On the other hand, if the objective lens 9a (revolver position 1) is inserted in the optical path, the CPU 55-1 detects the status different from the objective lens 9e (revolver position: 2)) when it is controlled. That is, the revolver 10 is manually operated, and it is detected through the revolver drive unit 52 that the objective lens 9e (revolver position: 2) is switched to the objective lens 9a (revolver position: 1) (YES in S50), and the process of the revolver position 1 shown in FIG. 18 is started.

Figure 18:
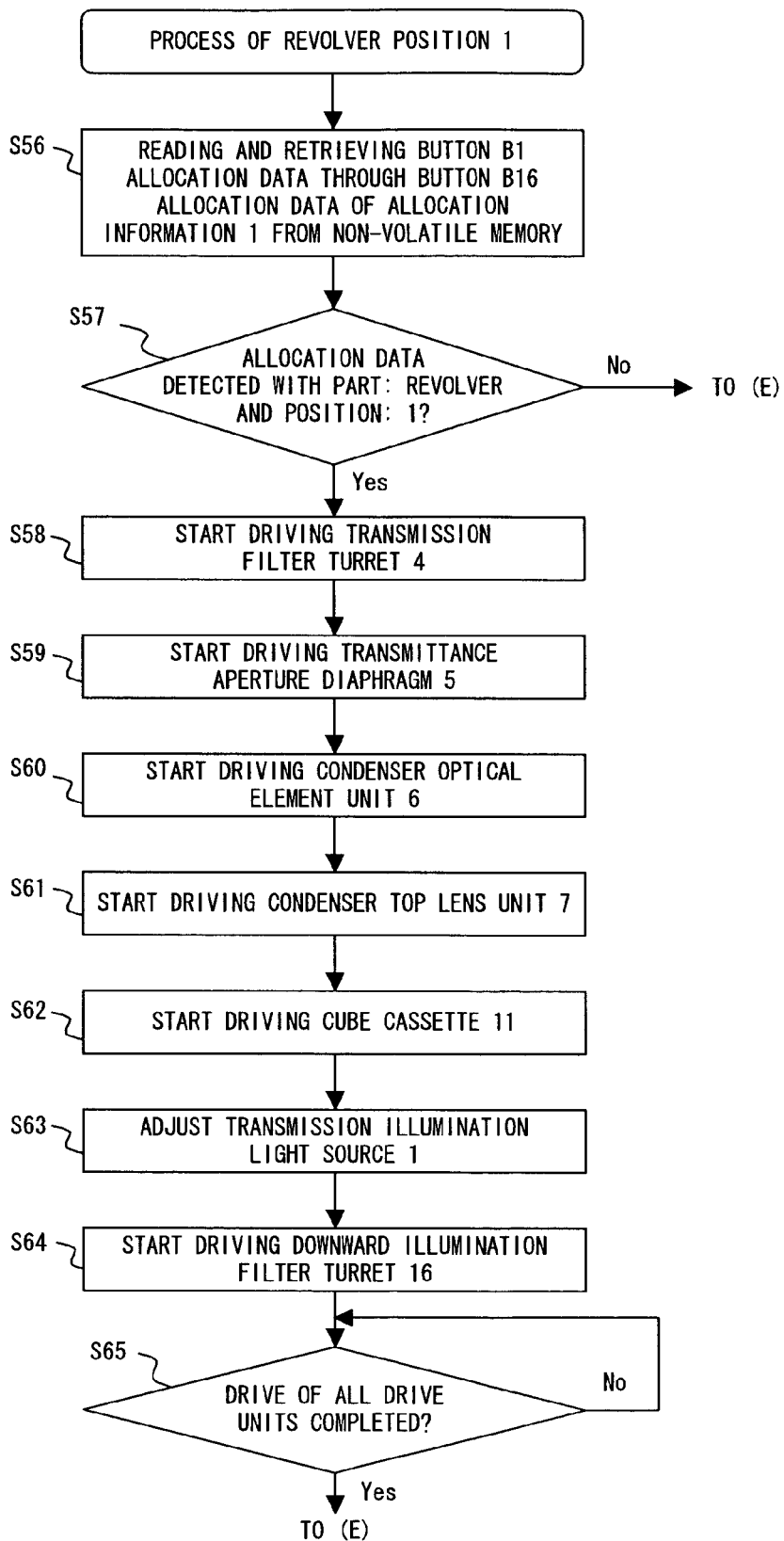
FIG. 18 is a flowchart relating to the process of the revolver position 1 according to the first embodiment of the present invention.

In this process of the revolver position 1, as shown in FIG. 18, first, the operation buttons B1 through B16 allocation data corresponding to the observing method allocated to the operation buttons B1 through B16 of the allocation information 1 selected by the DIP-SW not shown in the attached drawings but provided in the control unit 55 is read, the allocation data in which the revolver is set as a part and 1 is set as a position is retrieved (S56), and it is determined whether or not there is the allocation data (S57). In this determination in S57, when the determination result is NO, no process is performed, control is returned to step S1 (control is passed to (E)), and the operation input of the next operation button B1 through B16 is awaited. When it is YES, each drive part is driven according to the allocation data.

In the present embodiment, as shown in FIG. 10, a revolver is set as a part, and 1 is set as a position in the operation button B1 allocation data of the allocation information 1. Therefore, the determination result in S57 is YES, and the CPU 55-1 obtains the operation button B1 allocation data by retrieval, and the drive of each drive part excluding the revolver 10 is started (S58 through S64). That is, the switching operation set in the numbers 1 through 4 and 6 through 8 excluding the number 5 as shown in FIG. 10 is started.

The process in S58 through S64 is the same as the processes in S21 through S24 and S26 through S28 in FIG.14. Therefore, the explanation is omitted here.

Then, the process in S64 is terminated, CPU 55-1 determines whether or not the drive of all drive units has been completed (S65). If the determination result is NO, the present determining process is repeated. If the determination result is YES, the objective lens 9a (revolver position: 1) terminates the process of the revolver position 1 which is a switching operation corresponding to the operation inserted in the optical path, control is returned to step S1 (control is passed to (E)), and the operation input of the operation buttons B1 through B16 is awaited.

Thus, when the revolver 10 is manually operated, and the objective lens 9a (revolver position is 1) is inserted into the optical path, the ND25 is arranged in the optical path in the transmission filter turret 4, the transmittance aperture diaphragm 5 is switched to the aperture diameter of 100, and the condenser optical element unit 6 has a blank hole for bright vision observation, the condenser top lens unit 7 is arranged in the optical path, the objective lens is switched to 10×, the mirror unit for bright vision is arranged in the optical path in the cube cassette 11, the transmission illumination light source 1 is adjusted to 9V, and the light shield plate is arranged in the down illumination optical path and the down illumination is shut off in the downward illumination filter turret 16. As a result, the transmittance bright vision observation is realized using a 10× objective lens.

Figure 19:
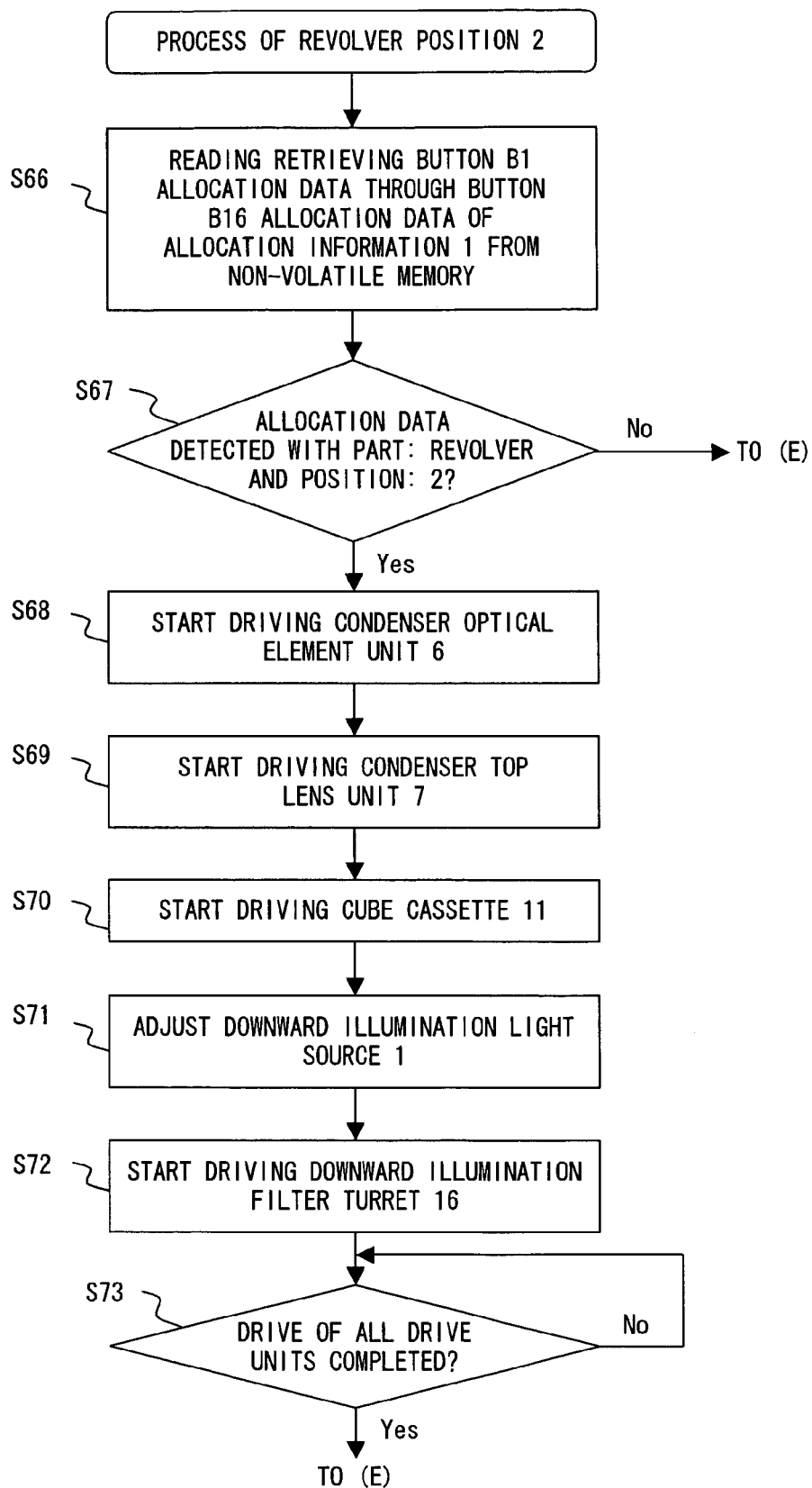
FIG. 19 is a flowchart relating to the process of the revolver position 2 according to the first embodiment of the present invention.

Thus, since the operation is similar, the detailed explanation is omitted, but the revolver 10 is turned. When the objective lens 9b (revolver position: 2) is inserted in the optical path, S51 indicates YES, and the process of the revolver position 2 shown in FIG. 19 is started.

In the process of the revolver position 2, the operation button B1 allocation data through the operation button B16 allocation data of the allocation information 1 are read from the non-volatile memory 55-4, the allocation data in which a revolver is set as a part and 2 is set as a position is retrieved (S66), and it is determine whether or not the allocation data exists (S67).

In the present embodiment, as shown in FIG. 11, a revolver is set as a part and 2 is set as a position in the operation button B2 allocation data of the allocation information 1. Therefore, the determination result of S67 is YES, and the CPU 55-1 obtains the operation button B2 allocation data is obtained by retrieval, and the drive of each drive part excluding the revolver 10 is started (S68 through S72). That is, the switching operation set in the number 1 to 2 and 4 to 6 excluding the number 3 shown in FIG. 11 is started. The process in S68 through S72 is the same as the process in S32 through 33 and S35 through 37 in FIG. 15, and the subsequent process in S73 are the same as shown in S65. Therefore, the explanation is omitted here.

Thus, when the revolver 10 is manually operated and the objective lens 9b (revolver position: 2) is inserted in the optical path, each drive part is arranged in a predetermined position as described above, and the downward fluorescent observation using a 20× objective lens is realized.

Figure 20:
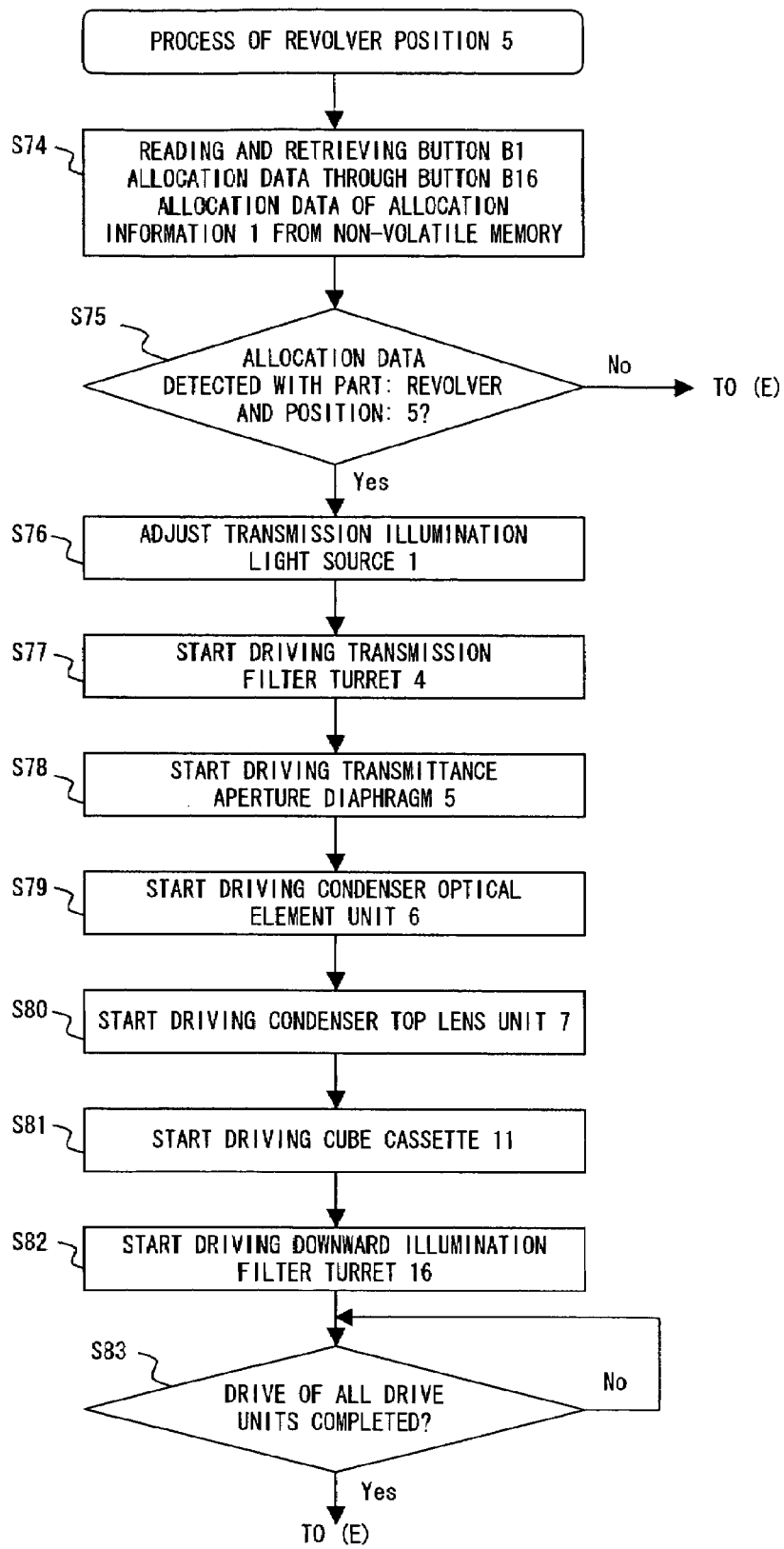
FIG. 20 is a flowchart relating to the process of the revolver position 5 according to the first embodiment of the present invention.

When the revolver 10 is manually operated and the objective lens 9e (revolver position: 5) is inserted in the optical path, YES is detected in S54, and the process of the revolver position 5 shown in FIG. 20 is started.

In the process of the revolver position 5, the operation button B1 allocation data to the operation button B16 allocation data of the allocation information 1 are read from the non-volatile memory 55-4, the allocation data in which a revolver is a part and 5 is a position is retrieved (S74), and it is determined whether or not there is the allocation data (S75).

In this example, as shown in FIG. 12, a revolver is set as apart and 5 is set as a position in the operation button B32 allocation data of the allocation information 1. Therefore, the determination result of S75 is YES, and the CPU 55-1 obtains the operation button B3 allocation data is obtained by retrieval, and the drive of each drive part excluding the revolver 10 is started (S76 through S82). That is, the switching operation set in the number 1 to 5 and 7 to 8 excluding the number 6 shown in FIG. 12 is started. The process in S76 through S82 is the same as the process in S41 through 45 and S47 through 48 in FIG. 16, and the subsequent process in S83 is the same as in S65. Therefore, the explanation is omitted here.

Thus, when the revolver 10 is manually operated and the objective lens 9e (revolver position: 5) is inserted in the optical path, each drive part is arranged, and a phase difference observation using a 10× objective lens is realized.

When the revolver 10 is manually rotated, and any of the objective lens 9c (revolver position: 3), 9d (revolver position: 4), or 9f (revolver position: 6) is inserted into the optical path, a corresponding revolver position process (process of the revolver position 3, process of the revolver position 4, or process of the revolver position 6) is performed as in the above-mentioned operation to realize a predetermined observation method.

As described above, in the present embodiment 1, the allocation information formed by the allocation data comprising an optical element and the arrangement status corresponding to each observation method allocated to each of the operation button B1 through B16 is stored in the non-volatile memory 55-4 in advance, and any of the operation buttons B1 through B16 is operated, the CPU 55-1 reads the allocation data in which the optical element and the arrangement status corresponding to the observation method allocated to the operation button from the non-volatile memory 55-4, each optical element is arranged in each optical path according to the allocation data to each optical path of the observation optical system and the illumination optical system. Therefore, depending on various observation method such as the bright vision observation method, the dark vision observation method, the differentiation interference observation method, the difference observation method, a fluorescent observation method, the composite observation method as a combination of these observation methods, a plurality of optical elements, for example, an observation optical system configured by the transmission filter turret 4, condenser optical element unit 6, the condenser top lens unit 7, the objective lens 9a through 9f, the cube cassette 11, etc., an illumination optical system configured by the transmission illumination light source 1 configuring, the downward illumination light source 14, etc. are selectively arranged in the optical path, and various observation method can be realized.

Furthermore, when the rotating operation is manually performed, the CPU 55-1 reads the allocation information formed by the allocation data comprising an optical element and the arrangement status corresponding to each observation method allocated to each of the operation button B1 through B16, and from the allocation information, the allocation data containing the revolver position after the switch is retrieved, and the optical element other than the revolver is arranged in each optical path of the observation optical system and the illumination optical system, thereby realizing each observation method. Therefore, the revolver position is not arranged in a position different to that of the allocation information in each observation method. Therefore, the observation can be performed under an appropriate condition.

Therefore, a plurality of optical elements can be arranged and set depending on various observation methods without complicated and large apparatus in a flexible and easy operation.

[Embodiment 2]

The second embodiment of the present invention is described below.

The feature of the present embodiment is not to immediately perform a predetermined subsequent switching operation on the various optical elements after a different status from that of the objective lens 9 of the previous control is detected by the CPU 55-1 when the revolver 10 in the above-mentioned embodiment 1 is manually rotated, and only after the status is held for a predetermined time, the switching operation on the subsequent optical elements is performed.

The configuration of the electric optical microscope apparatus is similar to that of the above-mentioned embodiment 1, but the operations are different. The operations different from those in the embodiment 1 and those performed when the revolver 10 is manually rotated are explained according to the flowchart shown in FIG. 21.

Figure 21:
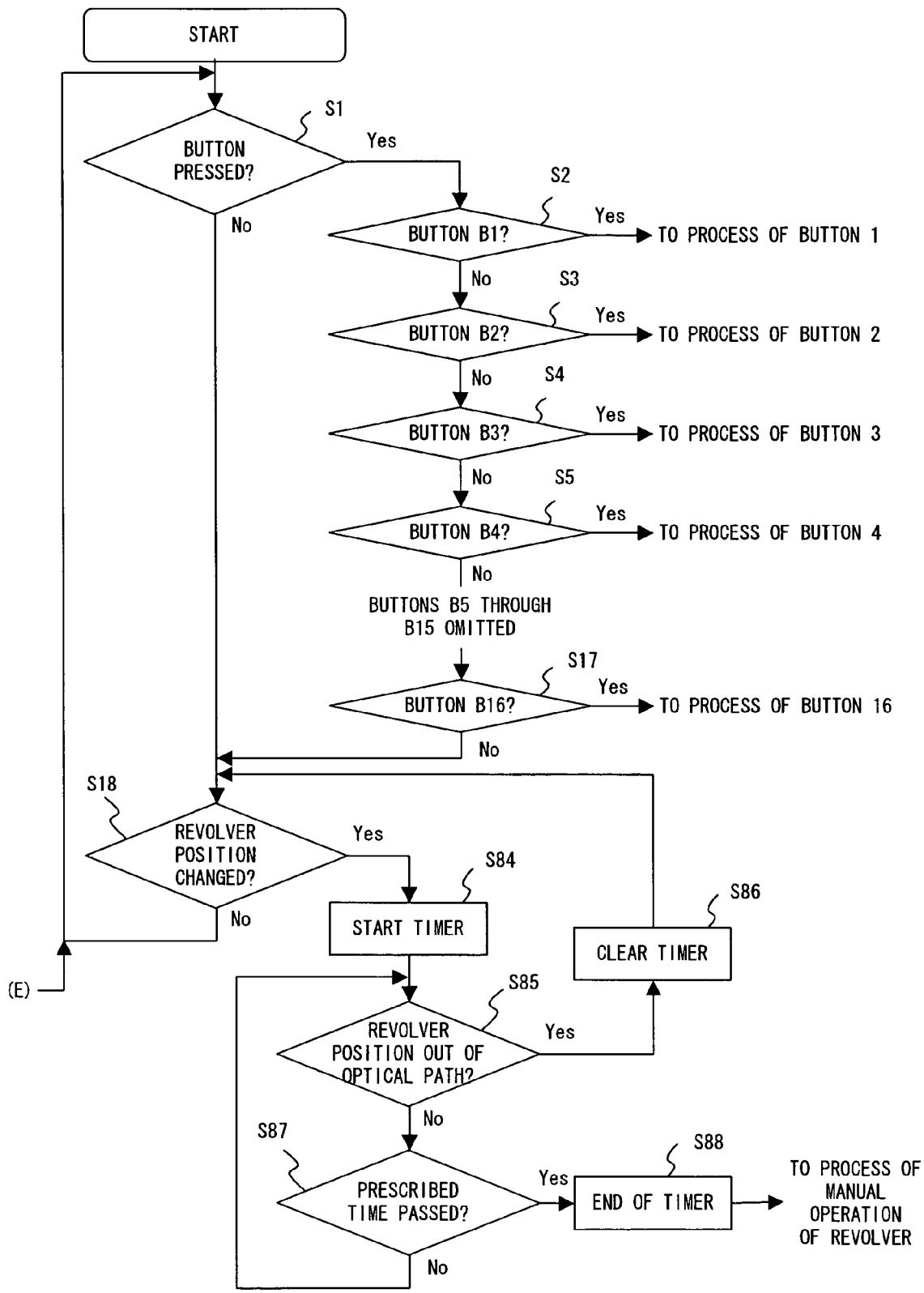
FIG. 21 is a flowchart relating to the process of the manual operation of the revolver according to the second embodiment of the present invention.

In FIG. 21, the same process as that shown in FIG. 13 is assigned the same step number. In FIG. 21, when the revolver 10 is manually operated and the objective lens 9 inserted in the optical path is switched, the CPU 55-1 detects the status different from that of the objective lens 9 in the previous switching control. That is, the switch of the objective lens 9 is detected through the revolver drive unit 52 (YES in S18).

Then, the CPU 55-1 starts the timer for counting in a predetermined time (S84), and then monitors the switch of the objective lens 9 through the revolver drive unit 52, and determines whether or not the objective lens 9 switched in S18 has been switched again, that is, whether or not the switched objective lens 9 has deviated from the optical path (S85).

In the determination in S85, when the determination result is YES, the timer is cleared (reset) (S86), and control is returned to step S18. When it is NO, it is determined whether or not the counter value of the timer indicates that the predetermined time (prescribed time) has passed (S87).

In the determination in S87, when the determination result is NO, control is returned to step S85. If it is YES, the timer completes the counting (S88), and control is passed to step the process of the manual operation of the revolver shown in FIG. 17.

In this process, unless the switched objective lens 9 deviates from the optical path, until the count of the timer passes a predetermined time after the objective lens 9 is switched, it is determined that the switch of the objective lens 9 has been completed, and control is passed to the manual process of the revolver.

The predetermined time can be a fixed value, but can be changed in the communications from the external PC through the external I/F, or the DIP-SW, etc.

As described above, in the present embodiment 2, when the revolver 10 is switched into two stages such as from the revolver position 1 to the revolver position 3, first a switching operation is made from the revolver position 1 to the revolver position 2, and furthermore by switching to a revolver position 3 within a predetermined time, the process of the manual operation of the revolver in the revolver position 2 can be avoided, and the process of the manual operation of the revolver corresponding to the revolver position 3 can be performed and various observation can be performed with a high degree of time efficiency.

In the above-mentioned embodiments 1 and 2, when the revolver 10 is manually operated, the manual operation of the revolver can be stated to a user by light emitting diodes such as an LED, etc., a sound generator such as a buzzer, etc., or communications using an external I/F.

Furthermore, in the embodiments 1 and 2, when the revolver 10 is manually operated, the possibility of the manual operation of the revolver for attaching/detaching other optical elements in the optical path can be selected.

In the above-mentioned embodiments 1 and 2, when the optical element other than the objective lens 9 is manually switched, the optical element including the objective lens 9 other than the optical element switched by the manual operation can be switched. For example, when the cube cassette 11 is manually switched, the operation can be performed. However, in this case, to detect the position of the cube cassette 11, the configuration of the cube cassette 11 shown in FIG. 7 can be structured as the cube cassette 11 as shown in FIG. 22.

With the configuration of the cube cassette 11 shown in FIG. 22, in addition to the configuration of the cube cassette 11 shown in FIG. 7A, the magnet sets 11-9 through 11-14 are attached on the brim of the circular plate 11-1. The magnet sets 11-9 through 11-14 detect which filter cube is arranged in the optical path in the filter cubes 11a through 11f held in the circular plate 11-1. For example, when the filter cube 11a held in the circular plate 11-1 is in the optical path, it can be detected by the Hall element 52-3 of the cube cassette drive unit 53 which is fixed to a fixing unit not shown in the attached drawings and not rotatable in the circular plate 11-1, and attached in the position opposite the magnet set 11-9. One magnet set is provided with three magnet attachment unit, and the combination of the presence/absence of the attachment of the magnet to the three magnet attachment unit identifies and detects the filter cubes 11a through 11f in the optical path. In this case, a table indicating the combination of the magnet set and the detection of the Hall element 53-4 is shown in FIG. 23.

In the above-mentioned embodiments 1 and 2, the revolver 10 can be electrically or manually driven, but the completely manually operated revolver provided with a sensor for determining the revolver position can be used.

In the above-mentioned embodiments 1 and 2, instead of the operation buttons B1 through B16, a corresponding button, etc. is displayed on the screen of the display unit 56-1, and the user touches the display screen like a touch panel or uses designation means such as a mouse, etc. for selection, thereby starting the similar operation as in the case in which any of the operation buttons B1 through B16 is pressed.

The electric optical microscope apparatus, the optical element arranging method, and the storage medium according to the present invention are described above, but the present invention is not limited to the above-mentioned embodiments, and can be improved and amended within the scope of the gist of the present invention.

In the present invention, with the electric optical microscope apparatus in which a plurality of optical elements are selectively arranged on the optical path, a plurality of optical elements can be flexibly and easily arranged and set depending on the observing method while avoiding a complicated and large apparatus.

What is claimed is:

1. An optical microscope apparatus comprising:
   a revolver which has a plurality of objective lenses attached thereto, and which is manually revolvable to switch an objective lens that is inserted in an optical path of the microscope;
   a plurality of additional optical elements, in addition to the objective lenses;
   a detection unit which detects at least one indicium on the revolver to identify a type of the objective lens inserted in the optical path and to detect when the objective lens inserted in the optical path is switched;
   a timer which counts a time elapsed from a time when the detection unit detects that the objective lens inserted in the optical path has been switched;
   a judgment unit which judges whether or not the elapsed time counted by the timer is longer than a predetermined time;
   a storage unit which stores information relating to an arrangement of the plurality of additional optical elements for each of a plurality of observation methods corresponding to the objective lenses; and
   an arrangement control unit which arranges the plurality of additional optical elements in accordance with the information stored in the storage unit corresponding to the type of optical element that is detected by the detection unit as being inserted in the optical path;

wherein the arrangement control unit does not arrange the plurality of additional optical elements in accordance with the stored information corresponding to the type of optical element that is detected by the detection unit as being inserted in the optical path until the judgment unit judges that the elapsed time counted by the timer has exceeded the predetermined time.

2. The apparatus according to claim 1, wherein the predetermined time is arbitrarily changeable.

3. An optical element arranging method for an optical microscope apparatus, wherein the optical microscope apparatus includes: (i) a revolver which has a plurality of objective lenses attached thereto, and which is manually revolvable to switch an objective lens that is inserted in an optical path of the microscope, (ii) a plurality of additional optical elements, in addition to the objective lenses, and (iii) a storage unit which stores information relating to an arrangement of the plurality of additional optical elements for each of a plurality of observation methods corresponding to the objective lenses, said method comprising:

detecting at least one indicium on the revolver to identify a type of the objective lens inserted in the optical path and to detect when the objective lens inserted in the optical path is switched;

counting a time elapsed from a time when it is detected that the objective lens inserted in the optical path has been switched;

judging whether or not the elapsed time is longer than a predetermined time; and arranging the plurality of additional optical elements in accordance with the information stored in the storage unit corresponding to the type of optical element that is detected as being inserted in the optical path, when it has been judged that the elapsed time has exceeded the predetermined time.

4. A computer-readable storage medium having a program stored thereon that is executable by a computer to cause the computer to control an optical microscope apparatus, wherein the optical microscope apparatus includes: (i) a revolver which has a plurality of objective lenses attached thereto, and which is manually revolvable to switch an objective lens that is inserted in an optical path of the microscope, (ii) a plurality of additional optical elements, in addition to the objective lenses, and (iii) a storage unit which stores information relating to an arrangement of the plurality of additional optical elements for each of a plurality of observation methods corresponding to the objective lenses, said program being executable by the computer to cause the computer to perform functions comprising:

receiving a result of detection of at least one indicium on the revolver, so as to identify a type of the objective lens inserted in the optical path and to detect when the objective lens inserted in the optical path is switched, based on the result of the detection;

counting a time elapsed from a time when it is detected that the objective lens inserted in the optical path has been switched;

judging whether or not the elapsed time is longer than a predetermined time; and arranging the plurality of additional optical elements in accordance with the information stored in the storage unit corresponding to the type of optical element that is detected as being inserted in the optical path, when it has been judged that the elapsed time has exceeded the predetermined time.

* * * * *